United States Patent
Zhang et al.

(10) Patent No.: US 12,387,502 B2
(45) Date of Patent: *Aug. 12, 2025

(54) VISUAL-INERTIAL POSITIONAL AWARENESS FOR AUTONOMOUS AND NON-AUTONOMOUS MAPPING

(71) Applicant: TRIFO, INC., Santa Clara, CA (US)

(72) Inventors: Zhe Zhang, Sunnyvale, CA (US);
Grace Tsai, Campbell, CA (US);
Shaoshan Liu, Fremont, CA (US)

(73) Assignee: TRIFO, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/624,062

(22) Filed: Apr. 1, 2024

(65) Prior Publication Data

US 2024/0355124 A1 Oct. 24, 2024

Related U.S. Application Data

(63) Continuation of application No. 17/872,997, filed on Jul. 25, 2022, now Pat. No. 11,948,369, which is a
(Continued)

(51) Int. Cl.
*G06V 20/56* (2022.01)
*G01B 11/24* (2006.01)
(Continued)

(52) U.S. Cl.
CPC ............. *G06V 20/56* (2022.01); *G01B 11/24* (2013.01); *G02B 27/0172* (2013.01);
(Continued)

(58) Field of Classification Search
CPC ...... G06K 9/00791; B60R 1/00; G01B 11/24; G02B 27/0172; G02B 27/0179; G06T 7/004; H04N 5/2257
See application file for complete search history.

(56) References Cited

U.S. PATENT DOCUMENTS 8,380,384 B2 2/2013 Lee et al.
8,565,958 B1 10/2013 Montemerlo et al.
(Continued)

FOREIGN PATENT DOCUMENTS

CN 104764452 A 7/2015
CN 105184776 A 12/2015
(Continued)

OTHER PUBLICATIONS

U.S. Appl. No. 15/250,419, filed Aug. 29, 2016, U.S. Pat. No. 10,032,276, Jul. 24, 2018, Issued.
(Continued)

*Primary Examiner* — Tsion B Owens
(74) *Attorney, Agent, or Firm* — Haynes Beffel & Wolfeld LLP; Andrew L. Dunlap; Paul A. Durdik

(57) ABSTRACT

The described positional awareness techniques employing visual-inertial sensory data gathering and analysis hardware with reference to specific example implementations implement improvements in the use of sensors, techniques and hardware design that can enable specific embodiments to provide positional awareness to machines with improved speed and accuracy.

20 Claims, 14 Drawing Sheets

Related U.S. Application Data continuation of application No. 17/182,073, filed on Feb. 22, 2021, now Pat. No. 11,398,096, which is a continuation of application No. 16/553,047, filed on Aug. 27, 2019, now Pat. No. 10,929,690, which is a continuation of application No. 15/250,581, filed on Aug. 29, 2016, now Pat. No. 10,402,663.

(51) Int. Cl.
*G02B 27/01* (2006.01)
*G06T 7/60* (2017.01)
*G06T 7/70* (2017.01)
*H04N 23/57* (2023.01)

(52) U.S. Cl.
CPC ............ *G02B 27/0179* (2013.01); *G06T 7/60* (2013.01); *G06T 7/70* (2017.01); *H04N 23/57* (2023.01); *B60R 2300/80* (2013.01); *G02B 2027/0138* (2013.01); *G06T 2207/10028* (2013.01); *G06T 2207/30244* (2013.01)

(56) References Cited

U.S. PATENT DOCUMENTS

| | | | |
|---|---|---|---|
| 8,655,094 | B2 | 2/2014 | Miller et al. |
| 8,774,517 | B1 | 7/2014 | Khosla et al. |
| 8,787,700 | B1 | 7/2014 | Aly et al. |
| 8,824,802 | B2 | 9/2014 | Kutliroff et al. |
| 8,825,391 | B1 | 9/2014 | Urmson et al. |
| 9,026,941 | B1* | 5/2015 | Krueger ............... H04L 67/10 715/963 |
| 9,058,563 | B1* | 6/2015 | Krueger ............. G06F 16/9537 |
| 9,076,212 | B2 | 7/2015 | Ernst et al. |
| 9,280,576 | B2* | 3/2016 | Trotta ................ G06F 16/2365 |
| 9,378,431 | B2 | 6/2016 | Stoeffler et al. |
| 9,420,265 | B2 | 8/2016 | Taguchi et al. |
| 9,519,289 | B2 | 12/2016 | Munich et al. |
| 9,607,428 | B2 | 3/2017 | Li |
| 9,751,210 | B2 | 9/2017 | Fong et al. |
| 9,836,653 | B2 | 12/2017 | Schnittman |
| 9,965,689 | B2 | 5/2018 | dos Santos Mendonca et al. |
| 10,032,276 | B1 | 7/2018 | Liu et al. |
| 10,043,076 | B1 | 8/2018 | Zhang et al. |
| 10,162,362 | B2 | 12/2018 | Tsai et al. |
| 10,222,805 | B2 | 3/2019 | Munich et al. |
| 10,395,117 | B1 | 8/2019 | Zhang et al. |
| 10,402,663 | B1 | 9/2019 | Tsai et al. |
| 10,423,832 | B1 | 9/2019 | Zhang et al. |
| 10,444,761 | B2 | 10/2019 | Liu et al. |
| 10,453,213 | B2 | 10/2019 | Tsai et al. |
| 10,496,103 | B2 | 12/2019 | Tsai et al. |
| 10,571,925 | B1 | 2/2020 | Zhang et al. |
| 10,571,926 | B1 | 2/2020 | Zhang et al. |
| 10,755,428 | B2* | 8/2020 | Aswin ................. G06N 3/0418 |
| 10,769,440 | B1 | 9/2020 | Zhang et al. |
| 10,832,056 | B1 | 11/2020 | Zhang et al. |
| 10,929,690 | B1 | 2/2021 | Tsai et al. |
| 10,943,361 | B2 | 3/2021 | Tsai et al. |
| 10,983,527 | B2 | 4/2021 | Tsai et al. |
| 11,126,196 | B2 | 9/2021 | Zhang et al. |
| 11,314,262 | B2 | 4/2022 | Zhang et al. |
| 11,328,158 | B2 | 5/2022 | Zhang et al. |
| 11,398,096 | B2* | 7/2022 | Zhang ................... G05D 1/245 |
| 11,948,369 | B2* | 4/2024 | Zhang ................. G05D 1/2435 |
| 2001/0043738 | A1 | 11/2001 | Sawhney et al. |
| 2007/0156286 | A1 | 7/2007 | Yamauchi |
| 2008/0249732 | A1 | 10/2008 | Lee et al. |
| 2009/0234499 | A1 | 9/2009 | Nielsen et al. |
| 2009/0285450 | A1 | 11/2009 | Kaiser et al. |
| 2009/0319170 | A1 | 12/2009 | Madsen et al. |
| 2010/0045701 | A1 | 2/2010 | Scott et al. |
| 2010/0094460 | A1 | 4/2010 | Choi et al. |
| 2010/0121601 | A1 | 5/2010 | Eckert |
| 2010/0220173 | A1 | 9/2010 | Anguelov et al. |
| 2011/0044543 | A1 | 2/2011 | Nakamura et al. |
| 2011/0288684 | A1 | 11/2011 | Farlow et al. |
| 2012/0121161 | A1 | 5/2012 | Eade et al. |
| 2012/0201469 | A1 | 8/2012 | Livet et al. |
| 2013/0120736 | A1 | 5/2013 | Bosse et al. |
| 2013/0282208 | A1* | 10/2013 | Mendez-Rodriguez ..................... G01S 17/933 701/16 |
| 2013/0335554 | A1 | 12/2013 | Brunner et al. |
| 2014/0207282 | A1 | 7/2014 | Angle et al. |
| 2014/0369557 | A1 | 12/2014 | Kayombya et al. |
| 2015/0012209 | A1 | 1/2015 | Park et al. |
| 2015/0071524 | A1 | 3/2015 | Lee |
| 2015/0219767 | A1 | 8/2015 | Humphreys et al. |
| 2015/0221133 | A1 | 8/2015 | Groten et al. |
| 2015/0268058 | A1 | 9/2015 | Samarasekera et al. |
| 2015/0369609 | A1 | 12/2015 | Roumeliotis et al. |
| 2016/0063330 | A1 | 3/2016 | Xu et al. |
| 2016/0144511 | A1 | 5/2016 | Romanov et al. |
| 2016/0188977 | A1 | 6/2016 | Kearns et al. |
| 2016/0209217 | A1 | 7/2016 | Babu et al. |
| 2016/0246302 | A1 | 8/2016 | Liao et al. |
| 2016/0327653 | A1 | 11/2016 | Humphreys et al. |
| 2016/0364835 | A1 | 12/2016 | Srebnik et al. |
| 2017/0004630 | A1 | 1/2017 | Al-Hamad et al. |
| 2017/0010109 | A1 | 1/2017 | Hayon et al. |
| 2017/0028556 | A1 | 2/2017 | Summer et al. |
| 2017/0083748 | A1 | 3/2017 | Zhou et al. |
| 2017/0089948 | A1 | 3/2017 | Ho et al. |
| 2017/0157769 | A1 | 6/2017 | Aghamohammadi et al. |
| 2017/0206418 | A1* | 7/2017 | Schnittman ........... G06F 18/217 |
| 2017/0277197 | A1 | 9/2017 | Liao et al. |
| 2017/0357873 | A1* | 12/2017 | Roimela .................... G06T 7/20 |
| 2018/0035606 | A1 | 2/2018 | Burdoucci |
| 2018/0074508 | A1 | 3/2018 | Kleiner et al. |
| 2018/0082128 | A1 | 3/2018 | Cameron et al. |
| 2018/0158197 | A1 | 6/2018 | Dasgupta et al. |
| 2018/0188032 | A1 | 7/2018 | Ramanandan et al. |
| 2018/0224286 | A1 | 8/2018 | Pickering et al. |
| 2018/0231385 | A1 | 8/2018 | Fourie et al. |
| 2018/0239355 | A1 | 8/2018 | Lee et al. |
| 2019/0025851 | A1 | 1/2019 | Ebrahimi Afrouzi |
| 2019/0197769 | A1 | 6/2019 | Khosrowpour |
| 2020/0043130 | A1 | 2/2020 | Qi |
| 2020/0241554 | A1 | 7/2020 | Takahashi et al. |

FOREIGN PATENT DOCUMENTS

| | | |
|---|---|---|
| CN | 106525003 A | 3/2017 |
| CN | 106537186 A | 3/2017 |
| CN | 106681330 A | 5/2017 |
| CN | 107137026 A | 9/2017 |
| CN | 107153247 A | 9/2017 |
| CN | 107235013 A | 10/2017 |
| CN | 107241441 A | 10/2017 |
| CN | 107273881 A | 10/2017 |
| CN | 107291080 A | 10/2017 |
| CN | 107323301 A | 11/2017 |
| CN | 107329478 A | 11/2017 |
| CN | 107444179 A | 12/2017 |
| CN | 107451611 A | 12/2017 |
| CN | 107462892 A | 12/2017 |
| CN | 107562660 A | 1/2018 |
| CN | 206932609 U | 1/2018 |
| CN | 206932645 U | 1/2018 |
| CN | 206932646 U | 1/2018 |
| CN | 206932647 U | 1/2018 |
| CN | 206932653 U | 1/2018 |
| CN | 206932676 U | 1/2018 |
| CN | 206932680 U | 1/2018 |
| CN | 206932902 U | 1/2018 |
| CN | 206935560 U | 1/2018 |
| CN | 206946068 U | 1/2018 |
| CN | 207070610 U | 3/2018 |
| CN | 207070612 U | 3/2018 |
| CN | 207070613 U | 3/2018 |
| CN | 207070619 U | 3/2018 |
| CN | 207070621 U | 3/2018 |
| CN | 207070629 U | 3/2018 |

(56) References Cited

FOREIGN PATENT DOCUMENTS

| CN | 207070630 U | 3/2018 |
|---|---|---|
| CN | 207070638 U | 3/2018 |
| CN | 207070639 U | 3/2018 |
| CN | 207070641 U | 3/2018 |
| CN | 207070652 U | 3/2018 |
| CN | 207070703 U | 3/2018 |
| CN | 207070709 U | 3/2018 |
| CN | 207070710 U | 3/2018 |
| CN | 207071933 U | 3/2018 |
| CN | 207073092 U | 3/2018 |
| CN | 207074202 U | 3/2018 |
| CN | 207074269 U | 3/2018 |
| CN | 207074560 U | 3/2018 |
| CN | 207151236 U | 3/2018 |
| CN | 207151465 U | 3/2018 |
| CN | 207152927 U | 3/2018 |
| CN | 207154149 U | 3/2018 |
| CN | 207154238 U | 3/2018 |
| CN | 207155071 U | 3/2018 |
| CN | 207155773 U | 3/2018 |
| CN | 207155774 U | 3/2018 |
| CN | 207155775 U | 3/2018 |
| CN | 207155776 U | 3/2018 |
| CN | 207155817 U | 3/2018 |
| CN | 207155818 U | 3/2018 |
| CN | 207155819 U | 3/2018 |
| CN | 207155840 U | 3/2018 |
| CN | 207155841 U | 3/2018 |
| CN | 207157464 U | 3/2018 |
| CN | 207158940 U | 3/2018 |
| CN | 207159724 U | 3/2018 |
| CN | 207159810 U | 3/2018 |
| CN | 207159811 U | 3/2018 |
| CN | 207159812 U | 3/2018 |
| CN | 207159840 U | 3/2018 |
| CN | 207159970 U | 3/2018 |
| CN | 207160626 U | 3/2018 |
| CN | 207164589 U | 3/2018 |
| CN | 207164772 U | 3/2018 |
| CN | 107958285 A | 4/2018 |
| CN | 107958451 A | 4/2018 |
| CN | 107976999 A | 5/2018 |
| CN | 108010271 A | 5/2018 |
| CN | 207321871 U | 5/2018 |
| CN | 207321872 U | 5/2018 |
| CN | 207321889 U | 5/2018 |
| CN | 207322208 U | 5/2018 |
| CN | 207322217 U | 5/2018 |
| CN | 207328169 U | 5/2018 |
| CN | 207328170 U | 5/2018 |
| CN | 207328818 U | 5/2018 |
| CN | 207328819 U | 5/2018 |
| CN | 207336762 U | 5/2018 |
| CN | 207354913 U | 5/2018 |
| CN | 207356393 U | 5/2018 |
| CN | 207356394 U | 5/2018 |
| CN | 207356420 U | 5/2018 |
| CN | 207356421 U | 5/2018 |
| CN | 207356422 U | 5/2018 |
| CN | 207356963 U | 5/2018 |
| CN | 207359050 U | 5/2018 |
| CN | 207360243 U | 5/2018 |
| CN | 207367052 U | 5/2018 |
| CN | 207367336 U | 5/2018 |
| CN | 207369157 U | 5/2018 |
| CN | 207443447 U | 6/2018 |
| CN | 207443493 U | 6/2018 |
| EP | 3224649 A1 | 10/2017 |
| JP | 2017053820 A | 3/2017 |
| JP | 2017538208 A | 12/2017 |
| WO | 0077786 A1 | 12/2000 |
| WO | 2012040644 A1 | 3/2012 |
| WO | 2016085717 A1 | 6/2016 |

OTHER PUBLICATIONS

U.S. Appl. No. 15/960,449, filed Apr. 23, 2018, U.S. Pat. No. 10,354,396, Jul. 16, 2019, Issued.
U.S. Appl. No. 15/250,393, filed Aug. 29, 2016, U.S. Pat. No. 10,043,076, Aug. 7, 2018, Issued.
U.S. Appl. No. 15/961,798, filed Apr. 24, 2018, U.S. Pat. No. 10,423,832, Sep. 24, 2019, Issued.
U.S. Appl. No. 16/577,653, filed Sep. 20, 2019, U.S. Pat. No. 10,832,056, Nov. 10, 2020, Issued.
U.S. Appl. No. 17/039,816, filed Sep. 30, 2020, U.S. Pat. No. 11,501,527, Nov. 15, 2022, Issued.
U.S. Appl. No. 17/984,963, filed Nov. 10, 2022, US 20230071839 A1, Mar. 9, 2023, Published.
U.S. Appl. No. 15/250,581, filed Aug. 29, 2016, U.S. Pat. No. 10,402,663, Sep. 3, 2019, Issued.
U.S. Appl. No. 16/553,047, filed Aug. 27, 2019, U.S. Pat. No. 10,929,690, Feb. 23, 2021, Issued.
U.S. Appl. No. 17/182,073, filed Feb. 22, 2021, U.S. Pat. No. 11,398,096, Jul. 26, 2022, Issued.
U.S. Appl. No. 17/872,997, filed Jul. 25, 2022, U.S. Pat. No. 11,948,369, Apr. 2, 2024, Issued.
U.S. Appl. No. 16/010,345, filed Jun. 15, 2018, U.S. Pat. No. 10,410,328, Sep. 10, 2019, Issued.
U.S. Appl. No. 16/010,331, filed Jun. 15, 2018, U.S. Pat. No. 10,366,508, Jul. 30, 2019, Issued.
U.S. Appl. No. 15/648,372, filed Jul. 12, 2017, U.S. Pat. No. 10,453,213, Oct. 22, 2019, Issued.
U.S. Appl. No. 16/656,043, filed Oct. 17, 2019, U.S. Pat. No. 10,943,361, Mar. 9, 2021, Issued.
U.S. Appl. No. 17/194,180, filed Mar. 5, 2021, U.S. Pat. No. 11,544,867, Jan. 3, 2023, Issued.
U.S. Appl. No. 18/091,825, filed Dec. 30, 2022, US 20230392934 A1, Dec. 7, 2023, Allowed.
201810764909, Filing Date Jul. 12, 2018, CN 109255749 B, Jan. 24, 2023, Granted.
U.S. Appl. No. 18/182,408, filed Jul. 9, 2018, EP 3428760 B1, Mar. 10, 2021, Granted.
Li, et.al., "High-precision, consistent EKF-based visual-inertial odometry", International Journal of Robotics Research, May 2013, 2 pages, [retrieved on Aug. 22, 2016]. Retrieved from the Internet: <http://ijr.sagepub.com/content/32/6/690.abstract>.
Mur-Artal, et al., Orb-Slam: A Versatile and Accurate Monocular SLAM System, abstract, IEEE Transactions on Robotics, 2015. vol 31, Issue 5, 2 pages, [retrieved on Aug. 22, 2016]. Retrieved the Internet: < >.
Rublee et al., "ORB: An efficient alternative to SIFT or SURF." Computer Vision (ICCV), 2011 IEEE international conference on. IEEE, 2011, 8 pages.
How Oculus Rift works: Everything you need to knowabout the VR sensation, 15-pages, [retrieved on Jul. 8, 2016]. Retrieved from the Internet: <http://www.wareable.com/oculus-rift/how-oculus-rift-works>.
ORB Feature Detector and Binary Descriptor, http://scikit-image.org/docs/dev/auto_examples/features_detection/plot_orb.html (accessed Feb. 13, 2018), 3 pages.
OpenCV—Camera Calibration and 3D Reconstruction, Open Source Computer Vision, https://docs.opencv.org/master/d9/doc/group_calib3d.html (accessed Feb. 13, 2018), 50 pages.
EP 18182408.7—Extended European Search Report dated Nov. 21, 2018, 12 pages.
EP 18182408.7—Response to Extended European Search Report dated Nov. 21, 2018, as filed Jun. 27, 2019, 24 pages.
EP 18182408.7—Communication under Rule 71(3) dated Sep. 29, 2020, 79 pages.
Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332 (Part 1 of 2).
Multilateration—Wikipedia, http://en.wikipedia.org/w/index.php?title=Multilaterationoldid=523281858, accessed Mar. 8, 2018, 5 pages.

(56) References Cited

OTHER PUBLICATIONS

Wahba, "A least squares estimate of satellite attitude," SIAM review 7, No. 3 (1965): 409-409.
Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332 (Part 2 of 2).
Endres, Felix, et. al., "An Evaluation of the RGB-D SLAM System", May 14, 2012, 6 pages.
Liang, "Research on Robot Indoor Localization and Mapping Based on Integration of Laser and Monocular Vision," 2016, 67 pages.

* cited by examiner

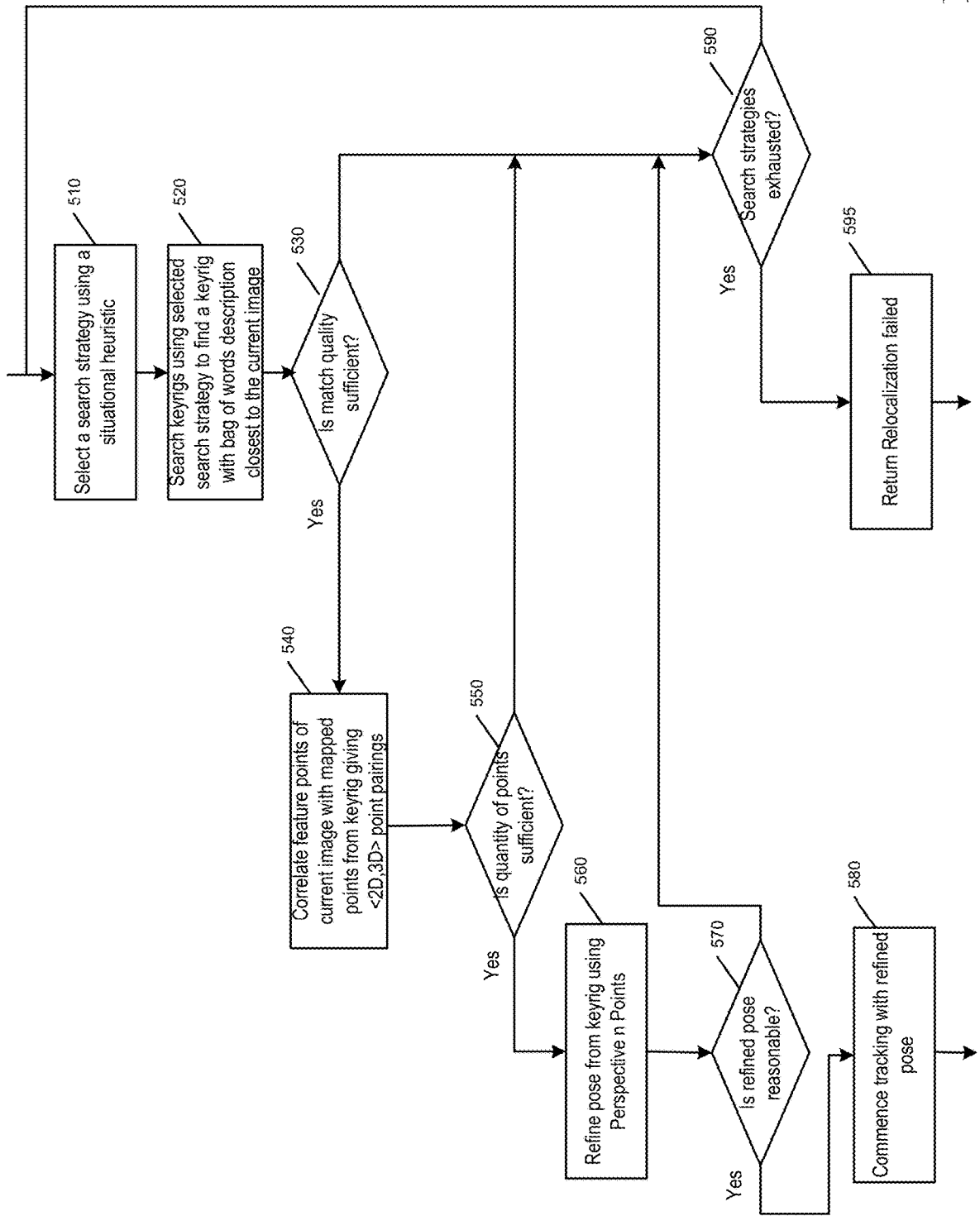

VISUAL-INERTIAL POSITIONAL AWARENESS FOR AUTONOMOUS AND NON-AUTONOMOUS MAPPING

PRIORITY APPLICATION

This application is a continuation of U.S. patent application Ser. No. 17/872,997, titled "VISUAL-INERTIAL POSITIONAL AWARENESS FOR AUTONOMOUS AND NON-AUTONOMOUS MAPPING", filed Jul. 25, 2022, which is a continuation of U.S. patent application Ser. No. 17/182,073, titled "VISUAL-INERTIAL POSITIONAL AWARENESS FOR AUTONOMOUS AND NON-AUTONOMOUS MAPPING", filed Feb. 22, 2021, now U.S. Pat. No. 11,398,096, issued Jul. 26, 2022, which is a continuation of U.S. patent application Ser. No. 16/553,047, titled "VISUAL-INERTIAL POSITIONAL AWARENESS FOR AUTONOMOUS AND NON-AUTONOMOUS MAPPING", filed Aug. 27, 2019, now U.S. Pat. No. 10,929,690, issued Feb. 23, 2021, which is a continuation of U.S. patent application Ser. No. 15/250,581, titled "VISUAL-INERTIAL POSITIONAL AWARENESS FOR AUTONOMOUS AND NON-AUTONOMOUS MAPPING", filed Aug. 29, 2016, now U.S. Pat. No. 10,402,663, issued Sep. 3, 2019. The priority applications are hereby incorporated by reference for all purposes as if fully set forth herein.

FIELD OF THE TECHNOLOGY DISCLOSED

The technology disclosed generally relates to detecting location and positioning of a mobile device, and more particularly relates to application of visual processing and inertial sensor data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge in realizing the truly autonomous robot is the need for the robot to be able to identify where they are, where they have been and plan where they are going. Traditional SLAM techniques have improved greatly in recent years, however, there remains considerable technical challenge to providing fast accurate and reliable positional awareness to robots and self-guiding mobile platforms.

With the recent proliferation of virtual reality headsets such as the Oculus Rift™, PlayStation™ VR, Samsung Gear™ VR, the HTC Vive™ and others, a new class of devices—one that is not autonomous but rather worn by a human user—that would benefit from fast, accurate and reliable positional information has arisen. Many technical challenges remain however in the field of enabling machines and devices to identify where they are, where they have been and plan where they are going. On especially challenging area involves recognizing a location and obstructions accurately and quickly. A variety of different approaches have been tried. For example RFID/WiFi approaches have proven to be expensive and of limited accuracy. Depth sensor based approaches have been found to be high cost and suffer from power drain and interference issues. Marker based approaches require markers placed within the work area-limiting the useful area in which the device can operate. Visual approaches currently are slow leading to failure when used in fast motion applications. Such approaches can also suffer scale ambiguity. Yet these implementations failed to live up to the standards required for widespread adoption.

The challenge of providing fast reliable affordable positional awareness to devices heretofore remained largely unsolved.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 5A illustrates an example relocalization process for a tracking system implementing the tracking process.

DESCRIPTION

Figure 1:
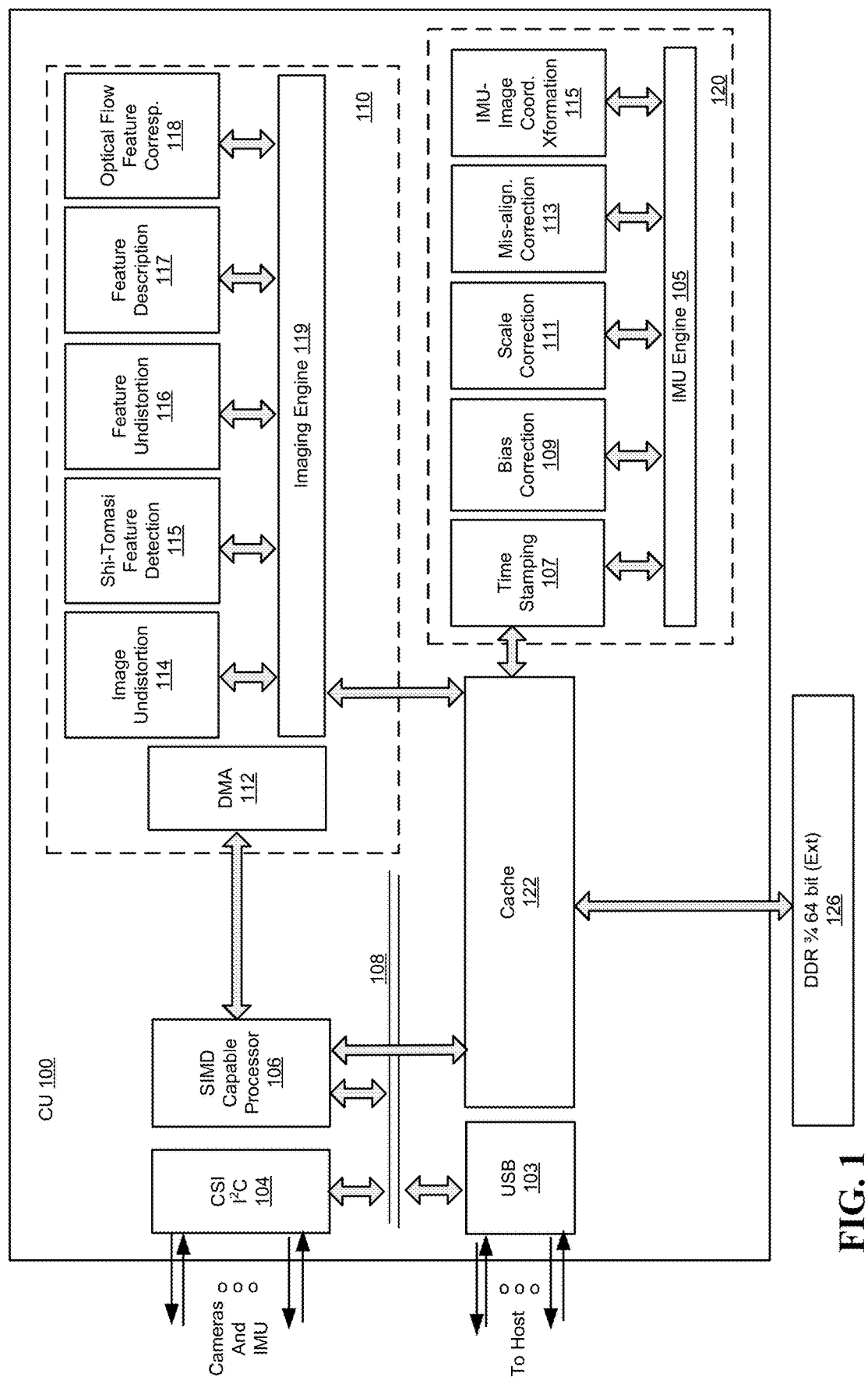
FIG. 1 illustrates an example of a visual-inertial sensor.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

This document describes positional awareness techniques employing visual-inertial sensory data gathering and analysis hardware with reference to specific example implementations. The discussion is organized as follows. First, an introduction describing some of the problems addressed by various implementations will be presented. Then, a high-level description of one implementation will be discussed at an architectural level. Next, the processes used by some implementations to efficiently process image and inertial data are discussed. Lastly, the technology disclosed will be illustrated with reference to particular applications of (i) Robots and self-guided autonomous platforms, (ii) virtual reality headsets and wearable devices, and (iii) augmented reality headsets and wearable devices. The references to specific examples are intended to be illustrative of the approaches disclosed herein rather than limiting.

Improvements in the use of sensors, techniques and hardware design can enable specific implementations to provide improved speed and accuracy, however, such improvements come with an increased number of parameters and significant memory and computational requirements. Conventional approaches to automatic guidance have largely focused on single sensor input. Camera based approaches have been relatively accurate, but suffer speed limitations (most hardware provide 30 fps, 60 fps at most), and are computationally expensive since these approaches process every pixel. Inertial guidance based approaches suffer from drift of the zero or origin point. Further, these approaches require expensive hardware in order to achieve useful results. WIFI and RFID approaches based on older technology exist, however, these have shown themselves to be limited in capability. Depth sensor based approaches are expensive. Further, these approaches require active sensing, so the computational cost is relatively high. Finally, the device's active sensing can pose interference issues.

To overcome the computational burden of processing large amounts of image data all the time, inertial data can be used to estimate changes in the environment due to changes in pose of the machine under guidance. To overcome the drift problems associated with inertial sensors, images can be captured and processed to correct and update pose estimates made based upon inertial data. Further, stereo imaging sensors comprised of RGB and grayscale camera combinations can provide stereo imaging capabilities, at lower cost points than stereo RGB systems. Yet further, using low-end sensors to construct a sensor, e.g., cameras having resolution of 640×480, obviates the cost of high-end image sensors. Still further, use of a low-power Control Unit to perform certain sensor based processing, instead of a powerful processor of a host or the machine under guidance, enables use of the system at reduced cost relative to conventional approaches. Implementations can be deployed in a variety of usage scenarios, including robot or other mobile platform guidance, Virtual Reality/Augmented Reality (VR/AR) headsets, goggles or other wearable devices, and others.

Examples of robot applications that benefit from employing positional awareness techniques such as described herein include:

Caregiver and Service robots (traveling on a ground plane).
A robot vacuuming/mopping/cleaning the floor.
A robot being commanded to carry objects around the environment.
A telepresence robot moving around a remote environment automatically.
A robot butler that follows a person around.

In each of the scenarios listed above, the robot utilizes the techniques described herein in order to track its own location and to recognize the objects that it encounters. Also, since the robot performs many complex tasks, each with real-time constraints, it is beneficial that the sensing be done rapidly to accelerate the perception pipeline. To overcome the computational burden imposed by this processing, implementations offload some computation from the main processor to the visual-inertial sensor module. In addition, since it is a mobile robot, which carries limited battery, energy consumption is a major challenge. Accordingly, some implementations offload some computational tasks from the main processor to a low-power sensor module, thereby enabling implementations to achieve overall energy efficiency. Since cost is an issue in mobile robots, because lowering the cost of the robot makes the robot affordable to more customers, cost reduction is another factor for sensor design. Accordingly, some implementations employ one low-cost grayscale sensor that is used for localization tasks, and one colored sensor for recognition tasks. This design point enables these implementations to significantly reduce the cost over a stereo colored sensor designs without sacrificing performance.

Virtual Reality (VR) and Augmented Reality (AR) scenarios require a wearable headset to track its own location, and maybe to recognize the objects that it encounters. In order to track its location, the wearable headset is equipped with a positional self-aware device that senses its own movement through a stereo inertial hardware sensor. Accordingly, the sensor generates reliable inertial data so that the tracking and mapping pipeline that follows can accurately infer the device's—and hence the headset's—location.

In implementations in which the device is embedded within another device, e.g., robot, mobile platform, wearable computer, AR/VR headset, goggles, wrist or other watches, etc., limited computational resources are available, while the workload of robot guidance, or AR/VR processing demands real-time performance, sensing is done rapidly to accelerate the perception processing pipeline. Accordingly, some implementations achieve these goals by offloading some computation from the main processor to the sensor module.

In addition, in AR/VR applications the mobile embedded device carries limited battery power, making energy consumption a challenge. Accordingly, some implementations offload some computation from the main processor to the low-power sensor module, in order to achieve overall energy efficiency.

Yet further, cost is an issue in many AR/VR applications because as the cost of the device is lowered, the potential to reach more customers is expanded. Hence cost is another factor for the sensor module design. Accordingly, some implementations use one low-cost grayscale sensor for localization tasks, and one colored sensor for recognition tasks. This design can provide significantly reduced cost over a stereo colored sensor design without sacrificing performance.

Examples of systems, apparatus, and methods according to the disclosed implementations are described in a robot guidance, VR and AR wearable device contexts with image and inertial data. In other instances, the technology disclosed can be applied to autonomous vehicle guidance technology, navigation, telecommunications systems, financial systems, security trading, banking, business intelligence, marketing, mining, energy, etc. and using sonar, audio, and LIDAR data. Other services are possible, such that the following examples should not be taken as definitive or limiting either in scope, context, or setting.

The technology disclosed relates to improving utilization of computing resources such as computational power and memory use during processing of image and inertial data inside a single input-multiple data (SIMD) architecture. The technology disclosed can be implemented in the context of any computer-implemented system including an reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system like a NEON ARM VFP9-S processor, an ARM core processor, or a compatible processor implementation.

In addition, the technology disclosed can be implemented using a variety of different imaging sensors and technologies, including RGB, grayscale, binary (e.g., digital image subjected to threshold intensity level), IR, sonar, LIDAR or combinations thereof.

System Overview

Stereo Visual-Inertial Sensor

FIG. 1 illustrates a visual-inertial sensor in block diagram format. Control Unit 100 in FIG. 1 can be coupled to an external memory 126, a flash memory (not shown by FIG. 1 for clarity sake), and one or more persistent storages such as HDDs, optical drives or the like (also not shown in FIG. 1 for clarity sake). Control Unit 100 includes a cache 122, a USB I/O port 103, a Camera Serial Interface (CSI) and an Inter-Integrated Circuit (I²C) I/O ports 104, a single instruction multiple-data (SIMD) capable processor 106 intercoupled by a local bus 108. An Imaging component 110 includes a direct memory access (DMA) 112, an image undistortion processor 114, a Shi-Tomasi processor 115, a feature undistortion processor 116, a feature description engine 117, an optical flow feature correspondence processor 118, under control of an Imaging Engine 119. In an embodiment, the external memory 126 is a 64 bit double data rate (DDR) random access memory (RAM). In an embodiment the SIMD capable processor 106 is implemented as a reduced instruction set computer (RISC) architecture. In an embodiment, the SIMD capable processor 106 is implemented as a NEON ARM VFP9-S.

The Inertial component 120 includes an Inertial Measurement engine 105 that implements a time stamping processor 107 that time stamps sets of inertial data from an inertial sensor (not shown in FIG. 1 for clarity sake), a bias correction processor 109 that corrects data readout from the timestamped inertial data, a scale correction processor 111 that applies stored scale factor information to the corrected inertial data, a mis-alignment correction processor 113 that corrects misalignments of sensory elements of the inertial measurement sensor, and an IMU-Image coordinate transformation processor 115 that computes transformations describing differences between a frame of reference of the inertial data and a frame of reference of the image data.

Visual-Inertial Sensor

Figure 2:
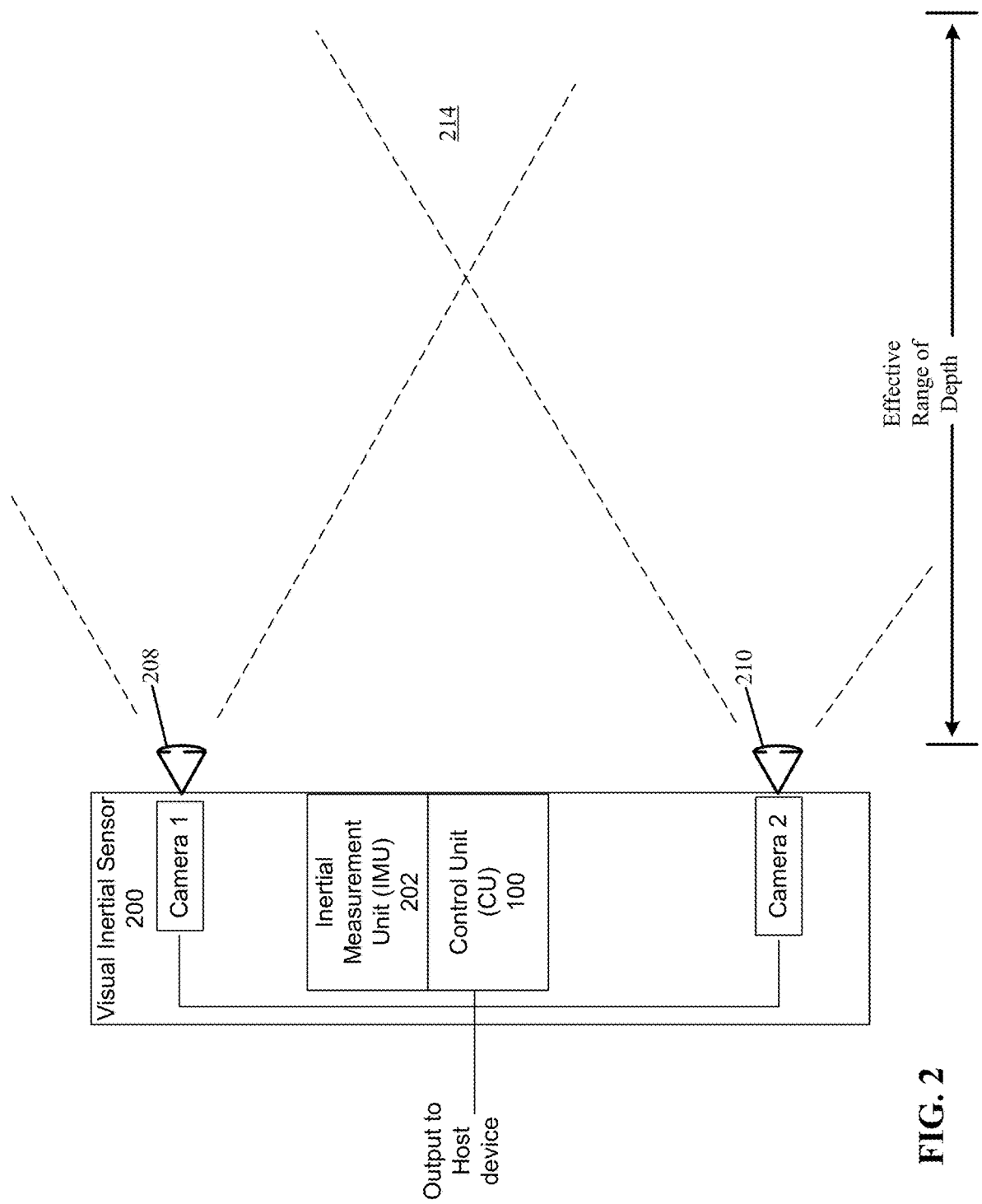
FIG. 2 illustrates an example of imaging configuration in which techniques described herein can be embodied.

FIG. 2 illustrates an example visual-inertial sensor implementation configured for determining positional information. Visual-inertial sensor 200 includes a grayscale camera 208, a colored camera 210, an Inertial Measurement Unit (IMU) 202, and a Computation Unit (CU) 100, having a USB interface to provide output to a host. Cameras 208, 210 include at least partially overlapping fields of view to provide a stereoscopic capable portion 214 within an effective range of depth of view of the visual-inertial sensor 200. Using cameras 208, 210, enables visual-inertial sensor 200 to generate image depth information, which is useful for agent localization tasks (including tracking, localization, map generation, and relocalization). In a representative implementation illustrated by FIG. 2, camera 208 is a grayscale camera used mainly for agent localization that extracts features from images and camera 210 is a colored camera that provides a plurality of functions: firstly, to extract features from images in agent localization (similar to the usage of grayscale camera), and secondly, to provide raw information for deep learning based tasks, including object recognition, object tracking, image captioning, and the like.

An IMU 202 provides raw sensor data for agent localization pipeline, which consumes IMU data at a high frequency (>200 Hz) to generate agent positional information in real-time. In an implementation, the localization pipeline combines information from IMU 202 which runs at relatively high frequency to provide frequent updates of less accurate information, and cameras 208, 210, which run at relatively lower frequency, 30 Hz, to provide more accurate information with less frequency.

The Control Unit 100 performs control of the sensors, IMU 202 and Cameras 208, 210, time stamping sensor data from the sensors, performs pre-computation in order to accelerate the localization pipeline, and packages raw data for sending over USB 103 to a host.

The USB interface 103 enables the visual-inertial sensor 200 to interact with a host. The host (not shown in FIG. 2 for clarity sake) can be a mobile device or a desktop/laptop computer, specialized machine controller, automobile control module, robot controller or the like, that consumes the data generated by the visual-inertial sensor 200. In various implementations, the host can perform additional computation to achieve agent localization and deep learning tasks. Implementations that perform data pre-processing on low-power CU 100 relieve the host processor (which has a much higher power consumption compared to low-power CU) from performing these tasks. As a result, such implementations achieve increased energy efficiency.

Note that one implementation averages the aligned images. In other implementations, other techniques are used. Also note that in another implementation an image quality measurement sub-step is included. So if the output image is too dark or still not sharp or clear enough, the image will be rejected and not passed to the rest of the pipeline.

Sensor Data Generation and Processing

In an embodiment, IMU raw data is corrected on the CU 100, thereby enabling implementations that do not require extra processing from the host processor, therefore accelerating the sensor pre-processing pipeline.

Time Stamping:

The time stamping processor 107 time stamps each set of inertial measurement data that the control unit 100 receives from the IMU sensor 202 data, in order to assure that the visual-inertial sensor 200 maintains a temporally accurate stream of sensor data. Such rigorous attention to maintaining the integrity of the sensor data stream enables implementations to provide agent localization that works reliably. Time-stamping raw data by the visual-inertial sensor obviates the need for complex synchronization tasks.

Bias Correction:

The bias correction processor 109 corrects IMU data readout from the timestamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in CU 100 to perform bias correction task on CU 100.

Scale Correction:

The scale correction processor 111 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s2, but there is a 2% scale factor error, the output measurement is 10.2 m/s2. The scale factor can be derived from the offline factory sensor calibration stage. This calibration information in CU 100 to perform scale correction task on CU 100.

Misalignment Correction:

The mis-alignment correction processor 113 corrects misalignments of sensory elements of the inertial measurement sensor. There are three gyroscopes and three accelerometers are mounted orthogonal to each other. The mountings, however, have errors and so are not perfectly 90 degrees. This leads to a correlation between sensors. For example, assume one axis is pointed perfectly up and the IMU is level. The accelerometer on this axis is measuring gravity. If the other two axes were perfectly orthogonal, they do not measure any of the effect of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 202 and the enclosure) can be removed by performing a bore-sighting estimation to determine the offset between the IMU 202 measurement frame and the sensor (objective) frame. The misalignment numbers can be derived from the offline factory sensor calibration stage. This calibration information in CU 100 to perform misalignment correction task on CU 100.

Sensor Visual Data Generation and Processing

Image Undistortion:

The image undistortion processor 114 corrects distortion in the image data in the captured frames. The image distortion is generally referred to an optical aberration that deforms and bends physically straight lines and makes them appear curvy in images. Optical distortion occurs as a result of optical design. In order to achieve reliable computer vision results, image undistortion processor 114 can undistort the image before further processing is performed. This can be achieved by using a lookup table of the size of the input image, and performing a remapping operation to undistort the whole image.

Feature Undistortion:

In cases when the remaining portions of the processing pipeline do not require the whole image, but only the feature points within the image, the feature undistortion processor 116 perform a feature undistortion operation on the CU. In detail, this operation runs after the feature extraction stage, and undistorts each feature point.

Feature Detection:

The Shi-Tomasi processor 115 performs feature detection upon image frames. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the CU 100 to relieve the host from performing such tasks, and to accelerate the feature detection process. Accordingly, in an implementation, processing includes:

Action 1: calculate eigen value for each pixel and determine (i) whether the feature is of interest; and (ii) for features of interest, a type of feature:
two small eigen values: feature is not interesting
one small, one big value: feature is likely an edge
two big values: feature is likely a corner
other type of features
Action 2: refine
Apply non-maximum suppression
Apply spatial binning
Apply heuristics
Apply other types of refinement Feature Description:

The feature description engine 117 performs feature description on detected features. The feature description includes methods to uniquely identify each detected points in an image. Feature description can be used to compare and match feature points between different images. Some implementations perform the feature description on the CU 100 to relieve the host from performing such tasks, and to accelerate the feature description process.

One implementation of feature description engine 117 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", http://scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

2D Feature Correspondence Generation:

The optical flow feature correspondence processor 118 performs 2D feature correspondence generation for the features. The feature correspondence computation is used to identify the feature points that appear in both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the CU 100 to relieve the host from performing such tasks, and to accelerate the feature correspondence generation.

One optical flow feature correspondence processor 118 implementation employs optical flow methods to calculate the motion between two image frames, taken at times t and $t+\Delta t$ at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image, Output: a list of locations of the last image's detected features' in the current image Assumption: brightness consistency, image changes by and only by motion Action 1: predict the output locations by either just assuming there is no motion so the current locations are the same as last frame's feature locations, OR use inertial information retrieved from an IMU to predict the locations.

Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

IMU-Camera Coordinate Transformation:

In some implementations, the IMU 202 and the cameras 208, 210 do not reside at the same physical location, there is a distance between the IMU 202 and the cameras 208, 210. Accordingly, in order to enable later processes in the localization pipeline to treat the IMU 202 and the cameras 208, 210 as being co-located, on implementation determines a transformation matrix between the IMU 202 and the cameras 208, 210, which can be achieved from an offline production or post-production calibration stage. In CU 100, this transformation matrix is stored locally, and applied to the IMU data. This technique enables later processes to be able to treat the IMU 202 and the cameras 208, 210 to be co-located.

Figure 3:
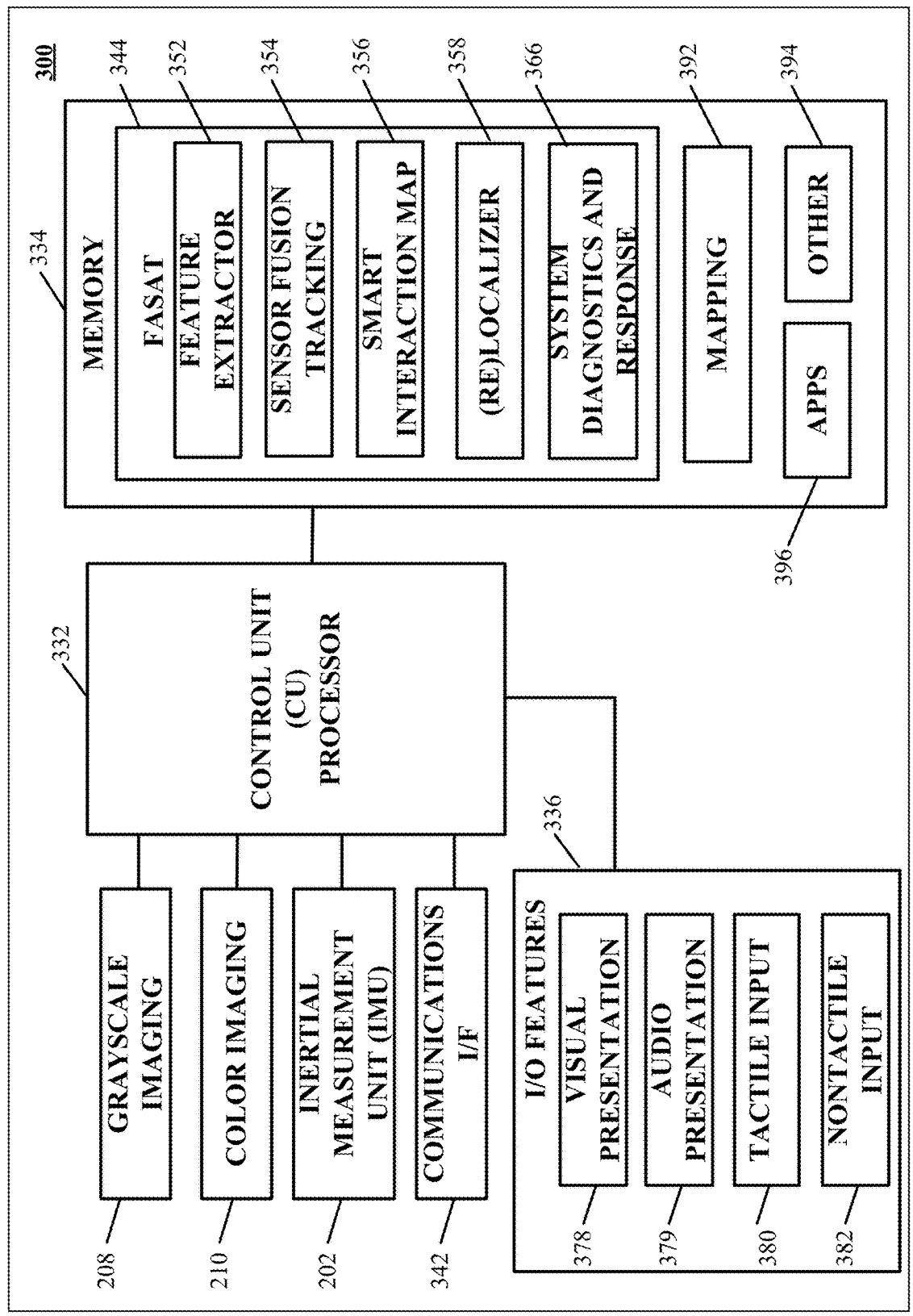
FIG. 3 illustrates an example of a visual-inertial sensory system.

Referring now to Referring now to FIG. 3, which shows a simplified block diagram of a visual-inertial positioning system 300 implementing visual-inertial sensor 200. Visual inertial positioning system 300 includes a processor 332, a memory 334, an inertial measurement unit IMU 202 and one or more cameras providing grayscale imaging 208 and color imaging 210, and a communications interface 342. One or more additional I/O features 336 are included to address implementation specific needs, such as a visual presentation interface 378, an audio presentation interface 379, sensor(s) for detecting tactile input (e.g., keyboards, keypads, touchpads, mouse, trackball, joystick and the like) 380 and non-tactile input (e.g., microphone(s), sonar sensors and the like) 382. Memory 334 can be used to store instructions to be executed by processor 332 as well as input and/or output data associated with execution of the instructions. In particular, memory 334 contains instructions, conceptually illustrated as a group of modules described in greater detail below, that control the operation of processor 332 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, IOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 332 is a NEON ARM processor implementing a single input-multiple data (SIMD) architecture as a reduced instruction set computer (RISC) architecture. Depending on implementation, however, processor 332 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 342 can include hardware and/or software that enables communication between visual inertial positioning system 300 and other systems controlling or enabling customer hardware and applications (hereinafter, a "host system" or "host") such as for example, a robot or other guided mobile platform, an autonomous vehicle, a virtual reality-augmented reality wearable device (VR/AR headset) or the like (not shown in FIG. 3 for clarity sake). Cameras 208, 210, as well as sensors such as IMU 202 can be coupled to processor 332 via a variety of communications interfaces and protocols implemented by hardware and software combinations. Thus, for example, positioning system 300 can include one or more camera data ports and/or motion detector ports (not shown in FIG. 3 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 344 executing on processor 332. In some implementations, visual-inertial positioning system 300 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 332, which may in turn be generated in response to user input or other detected events.

Instructions defining FASAT process 344 are stored in memory 334, and these instructions, when executed, perform analysis on image frames captured by the cameras 208, 210 and inertial data captured by the IMU 202 connected to visual inertial positioning system 300. In one implementation, FASAT process 344 includes various logical processes, such as a feature extractor 352 that receives a raw image and determines a salient points' representation of objects in the image thereby representing the geometry understanding of the objects from a machine's perspective view. In some implementations, feature extractor 352 analyzes images (e.g., image frames captured via cameras 208, 210) to detect edges of an object therein and/or other information about the object's location. A sensor fusion tracking process 354 uses feature extraction results and inertial data from IMU 202 to generate pose accurately and rapidly. A smart interaction map 356 enables using a known map of obstructions to localize the sensor 200. The map is built using mapping functionality of mapping process 392, which is described in further detail herein below. A Re-localizer process 358 recovers device positional awareness when the device has lost track of device position. A system diagnostic and response (SDAR) 366 manages of current localizing state of the device and provide response strategy.

A mapping process 392 generates a hybrid occupancy grid that maps the space and objects recognized by the feature extractor 352. The hybrid occupancy grid includes (i) a point cloud representation of points in space located in the image frames and (ii) one or more x-y plane occupancy grids arranged at heights to intersect points on the extracted features.

In some implementations, other processing 394 analyzes audio or ultrasonic signals (e.g., audio signals captured via sonar or audio sensors comprising non-tactile input 382) to localize objects and obstructions by, for example, time distance of arrival, multilateration or the like. ("multilateration is a navigation technique based on the measurement of the difference in distance to two or more stations at known locations that broadcast signals at known times. See Wikipedia, at <http://en.wikipedia.org/w/index.php?title=Multilateration&oldid=523281858> on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 394 determines paths to track and predict device movements in space based upon the hybrid occupancy grid generated by mapping process 392. Some implementations 394 includes an augmented reality (AR)/virtual reality (VR) environment that provides integration of virtual objects reflecting real objects (e.g., virtual presence of friend 915 in FIG. 9) as well as synthesized objects 1015 in FIG. 10 for presentation to user of device 925 in FIG. 9 via presentation interface 378 to provide a personal virtual experience. One or more applications 396 can be loaded into memory 334 (or otherwise made available to processor 332) to augment or customize functioning of device 200 thereby enabling the system 300 to function as a platform. Successive camera images are analyzed at the pixel level to extract object movements and velocities. In some implementations, presentation interface 378 includes a video feed integrator provides integration of live video feed from the cameras 208, 210 and one or more virtual objects. Video feed integrator governs processing of video information from disparate types of cameras 208, 210. For example, information received from pixels that provide monochromatic imaging and from pixels that provide color imaging (e.g., RGB) can be separated by integrator and processed differently. Image information from grayscale sensors can be used mainly for agent localization that extracts features from images and camera 210 is a colored camera that provides a plurality of functions: firstly, to extract features from images in agent localization (similar to the usage of grayscale camera), and secondly, to provide raw information for deep learning based tasks, including object recognition, object tracking, image captioning, and the like. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. An imaging integrator can be used in conjunction with AR/VR environment control the creation of the environment presented to the user via presentation interface 378.

Presentation interface 378, audio presentation 379, non-tactile input 382, and communications interface 342 can be used to facilitate user interaction via device 200 with Visual inertial positioning system 300. These components can be of highly customized design, generally conventional design or combinations thereof as desired to provide any type of user interaction. In some implementations, results of analyzing captured images using inertial measuring unit 202 and cameras 208, 210 and FASAT program 352 can be interpreted as representing objects and obstacles in 3D space. For example, a robot equipped with visual-inertial sensor 200 can perform path planning and/or obstacle avoidance across a surface that has been analyzed using FASAT program 352, and the results of this analysis can be interpreted as an occupancy map by some other program executing on processor 332 (e.g., a motion planner, localization and tracking process, or other application). Thus, by way of illustration, a robot might use sweeping of cameras 208, 210 across a room in order to "map" a space currently imaged to a hybrid point grid that can be used by a host device such as a monitor, VR headset or the like via presentation interface 378, to provide visual input of the area that the robot is "seeing". Smart interaction map 356 may use the representation of space built by mapping 392 to plan a path for a robot or mobile platform through the space, e.g., to improve localization and tracking of the robot or platform through the space.

It will be appreciated that Visual-inertial positioning system 300 is illustrative and that variations and modifications are possible. Visual inertial positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the visual-inertial system 300 or may be supplied as separate components. Further, an image or audio analyzer can be implemented using only a subset of Visual inertial positioning system 300 components (e.g., as a processor executing program code, an ASIC, or a fixed-function digital signal processor, with suitable I/O interfaces to receive image data and output analysis results).

While Visual inertial positioning system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 352 by processor 332 can cause processor 332 to operate inertial measurement unit 202 and cameras 208, 210 to capture images and/or audio signals of an object traveling across and in contact with a surface to detect its entrance by analyzing the image and/or audio data.

Tracking

Tracking refers to capabilities rendered by system hardware and functional processes that enable a controlled device (robot, mobile platform, or VR/AR headset, goggles, or other hardware) to continuously localize itself and have positional awareness e.g., the sensor system can determine where it is in the real world.

Architecture for Tracking System

Figure 4:
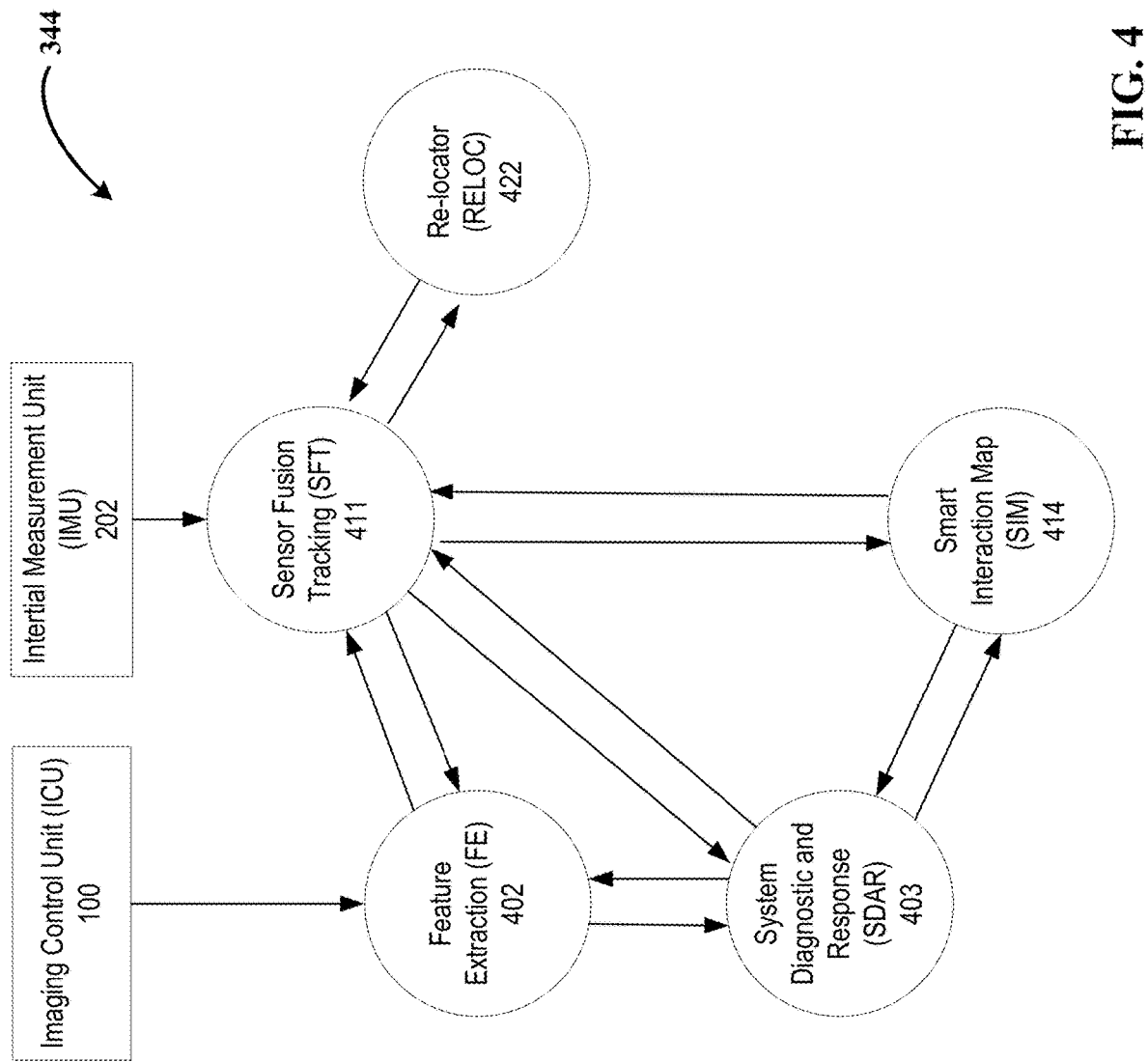
FIG. 4 illustrates an example tracking system implementing the tracking process.

FIG. 4 illustrates example architecture for a tracking system implementation. As shown in FIG. 4, components and information flows between components of an example fast accurate stable adaptive tracking ("FASAT") process 344 of FIG. 3 are illustrated by feature extractor (FE) 402, sensor fusion based tracker (SFT) 411, smart interaction with map (SIM) processor 414, a system diagnostics and response (SDAR) processor 403 and a Re-locator (RELOC) 422. The data flows and operation of one example implementation of these components will next be described.

Feature Extraction

A feature extractor (FE) 402 represents the geometric understanding of a space from a machine's perspective view. Feature extractor 402 receives raw image information from control unit 100 and provides a salient points' representation hybrid point cloud map to a sensor fusion tracker (SFT) 411. One implementation of a feature extractor 402 performs a variety of actions including image preprocessing, feature detection, and feature descriptor preparation.

Image processing tasks include performing Gaussian blur and gamma correction on raw image data.

Feature Detection: Optical Flow

Optical flow gives 2D-2D correspondence between previous image and a current image. Feature extractor 402 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g. the size of the image in the previous level. For example, if an image on the first ("zero level") has a size 640×480, then the size of the corresponding image on the next higher level ("first level") has a size 320×240, and an next corresponding image at the next higher level ("second level") has a size 160×120. If the same feature point appears at more than one level, then that feature point is determined by the system to be a strong feature point. In the foregoing example, a scale factor of 2 is used, however, any scale factor can be selected, e.g., a scale factor of 1.6 provides the original 640×480 image with a next level image having a resolution of 400×300.

One feature extractor 402 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image, Output: a list of locations of the last image's detected features' in the current image Assumption: brightness consistency, image changes by and only by motion Action 1: predict the output locations by either just assuming there is no motion so the current locations are the same as last frame's feature locations, OR use inertial information retrieved from an IMU to predict the locations.

Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

Feature Detection: Shi-Tomasi

One implementation of feature extraction processor 402 uses NEON-accelerated Shi-Tomasi feature detection with spatial binning in order to obtain features from regions to cover as much as possible for the full image. The feature extractor 402 uses IMU and the pose information received from sensor fusion tracker 411 in order to dynamically decide the regions to track and the parameters to use. Features are "interesting" parts of an image. Accordingly, in an implementation, processing includes:

Action 1: calculate Eigen value of the intensity value of each pixel and its surrounding pixels; and determine (i) whether the feature is of interest; and (ii) for features of interest, a type of feature two small Eigen values: feature is not interesting one small, one big value: feature is likely an edge two big values: feature is likely a corner other type of features Action 2: refine Apply non-maximum suppression Apply spatial binning Apply heuristics Apply other types of refinement Feature Descriptor: ORB Descriptor One implementation of feature extractor 402 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", http://scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

Bag-of-Words

One implementation of feature extractor 402 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256 bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, then the camera taking image D is closest to the camera pose used when taking image B, not A or C.

One implementation of feature extractor 402 adaptively adjusts a threshold that is applied to a number of features needed in order for the system to keep track of a moving object. Such intelligent thresholds include a threshold that is adaptively adjusted based upon device movement, sensor readings, situational or environmental variables (e.g., low light, fog, bright light, and so forth) or combinations thereof. Once sufficient number of features (e.g., above the threshold) are identified, the system will continue to track an object. Otherwise, the system does not track the object. Feature extractor 402 will adaptively adjust the threshold based on device movement and other sensor levels.

SFT: Generating Pose information from Feature Extraction results and Inertial Data Sensor fusion based tracker (SFT) 411 determines how to smartly use feature extraction results and inertial data from IMU 202 to generate pose accurately and rapidly. Sensor fusion based tracker 411 performs initialization for the system state, feature extractor initial state, interaction with map state, and other states. Sensor fusion based tracker 411 has logic to decide how to initialize the state including use how many first sample IMUs, how many images to skip, and any other initialization steps for specific hardware.

In an implementation, sensor fusion based tracker 411 performs IMU buffer management. Timestamps of IMU data frames are corrected and aligned. Additionally, IMU information that has not been processed yet is maintained in a buffer.

Propagation:

Implementations can employ extended Kalman filtering (EKF), shown in a general nonlinear model form by equations (1), to extrapolate an initial pose using inertial data from the multi-axis IMU, to generate a propagated pose:

$$\dot{x} = f(x) + w \quad (1)$$
$$z = h(x) + n$$

where x denotes a state vector, f denotes a nonlinear function, h denotes observation nonlinear function, n denotes measurement noise, z denotes an observation vector, and w denotes a noise vector.

A linearized version of the discrete-time model of equation (1) is useful for covariance propagation and update, as well as gain computation is illustrated by equations (2):

$$\tilde{X}_{l+1} \cong \varphi_l \tilde{X}_l + w_l \quad (2)$$
$$\tilde{r}_l \cong H_l \tilde{X}_l + n_l$$

In an implementation, IMU data alone is used to perform propagation of the EKF. This enables certain implementations to provide fast results and at relatively low computation costs. An update process described below is employed to correct for "drifting" that occurs when only inertial information is used in the EKF to determine pose. Propagation can be performed in a number of ways: (i) the propagation happens right after an inertial measurement taken by the IMU arrives; or (ii) delayed propagation happens in batch right after an image taken by the visual sensors arrives but before the update procedure described below is performed. Of course, wheel odometry and/or user-defined control can also be used to perform propagation. In one implementation, a "plug-and-play" decision engine will decide if, when, and how to do multiple types of propagation.

Update:

In an implementation, an update process is performed using image information together with IMU buffer samples, which can correct the pose which may be drifted from propagation. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log (n) search with the use of a kd-tree or octree. During search, use previous time period velocity/acceleration to predict a pose so as to narrow the search region. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

In a multiple observation implementation, based on multiple previous image observation, information from multiple poses is used in the extended Kalman filter described herein with reference to equations (1) and (2). Every feature's whole life is used in the extended Kalman filter.

SIM: Smart Map Interaction and Localize

Smart interaction with map (SIM) processor 414 enables smart interaction by a device being guided (i.e., receiving positional awareness information from visual-inertial sensor system 300) with a known map in order to localize itself. Accordingly, one implementation of a smart interaction map processor 414 processing includes:

Perform a query of the map based on a need and a current status. Some query components included by specific implementations are map points (xyz, uncertainty, average reprojection error, etc.), keyrigs' poses, 2D-3D constraint information, and occupancy grid (one layer or multiple layer). As used herein, the term keyrig denotes a set of image data received. In some implementations, the sets of image data include feature points and pose information. The pose information includes a location of the mobile device and view of the camera that captured the image data. The sets of image data are referred to collectively as keyrigs.

If the map as a whole is not big, e.g., meets a particular threshold size, return the entire map.

Otherwise, if the map is big, e.g., meets or exceeds a particular threshold size and covers large areas, e.g., spatial area meets or exceeds a particular threshold, smartly grab a local region of map based on the device's current position.

If some area of the map is known to have bad quality, don't use it.

Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 403 performs system level management of current localizing state of the visual-inertial sensor 200 and provides response strategy. In one implementation, the system diagnostics and response processor 403 monitors tracked map points and corresponding reprojection error, monitors the longevity of untracked map points, and suggests actions to mapping module, monitors device speed/acceleration/jitter/drift, monitors map "activity" (i.e., is it updated regularly?), performs new added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 422 recovers a device that has lost track of its positional from this state. Once re-locator 422 returns the lost device back on track, the device can resume normal interacting with smart interaction map processor 414, and/or can contribute to map building, using the techniques described herein below.

Relocalization

FIG. 5A illustrates an example of a relocalization process in one implementation. Accordingly, one implementation of relocalization processing 500A includes:

In action 510, a search strategy is selected using a situational heuristic. For example, if there are many keyrigs, (e.g., >50) and a fast recovery is needed, then select a search strategy of performing a best match (on Bag-of-Words features) among the keyrigs, and using the best-matched keyrig's pose as end-result. In another example, if it is determined that the system is well on-track before lost, then select a search over only the local (e.g., most recent x keyrigs) keyrigs for fast recovery. In a further example, if the system needs multiple hypotheses before further refinement, then select a search strategy that includes using the few best matches (on Bag-of-Words features). Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

In action 520, the keyrigs are searched using the selected search strategy in order to find among the keyrigs a keyrig with bag of words description closest to a bag of words description of a current image.

In action 530, determine whether the match quality is sufficient. This can be determined by applying a threshold to a quality of match indication or by other means. For example, a match quality indicator ranges from 0, denoting complete difference, to 1, denoting an exact match. A corresponding match quality threshold can be 0.85 indicating a minimum passing match quality. If the match quality is sufficient, then continue with action 540. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

In an action 540, correlate feature points of the current image with mapped points from the keyrig selected in action 520, yielding <2D, 3D> point pairings. The point pairings indicate a relationship between the 2D current image and the 3D map of the selected keyrig.

In an action 550, determine if the quantity of points is determined to be sufficient. This can be determined by applying a threshold to the quantity of 2D image points having a correspondence with a 3D point in the map of the selected keyrig. For example, in one implementation 6 or more points is sufficient; while in another implementation 20-30 points are required. If the quantity of points is sufficient, then continue with action 560. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

In action 560 refine the pose from the best matched keyrig and perform perspective-n-points (PnP)—or other pose estimation method that computes a pose from 2 sets of 2D image features. While any of a wide variety of PnP implementations can be used to refine pose information, one OpenCV API called solvePnPRansac has been found to perform acceptably in an example implementation. Further description of the solvePnPRansac API can be obtained with reference to "Camera Calibration and 3D Reconstruction" http://docs.opencv.org/master/d9/doc/group_calib3d.html #gsc.tab=0 (last accessed Aug. 22, 2016).

In an action 570, determine whether the refined pose is reasonable. In one implementation a refined pose is considered reasonable if the refined pose meets criteria: (i) the refined pose is sufficiently similar (e.g., within a tolerance or below a threshold) in position and perspective from the pose of the identified keyrig selected based upon the matching in action 520; and (ii) reprojection of 3D points in the <2D, 3D> point pairings identified in action 540 yields a new 2D point on the 2D image plane, where the new 2D point has coordinates sufficiently similar (e.g., within a tolerance or below a threshold) to the original 2D point of the <2D, 3D> point pairing. If the defined pose is reasonable, then continue with action 580. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

Figure 5B:
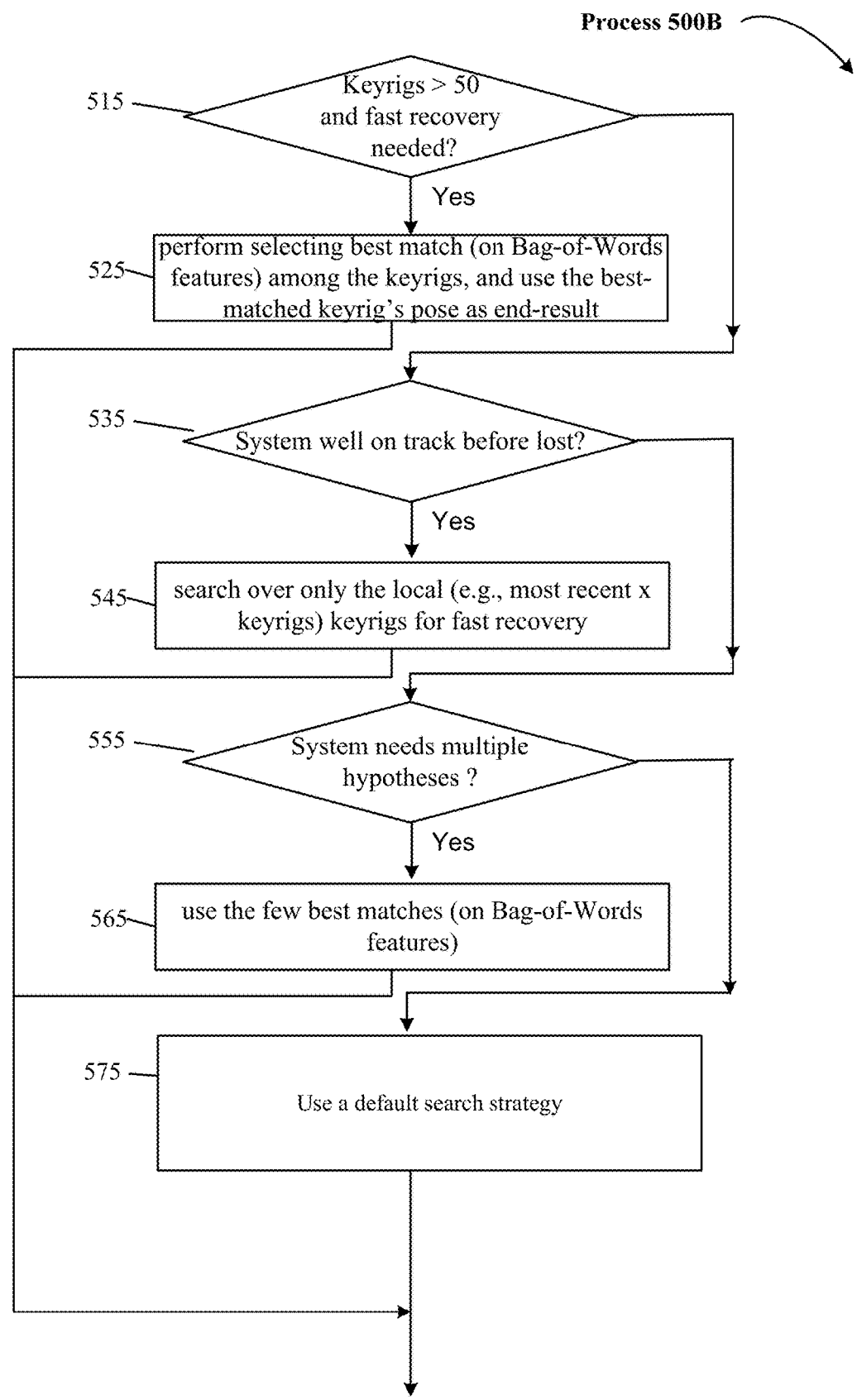
FIG. 5B illustrates an example of a relocalization search strategy selection process in one implementation.

In an action 580, commence tracking with the refined pose. Also, record the whole recovery information, and: update machine state with the refined pose information as the current pose put the device back on track with some uncertainty FIG. 5B illustrates an example of a relocaliztion search strategy selection process in one implementation. Accordingly, one implementation of the processing 500B provides selecting a search strategy using a situational heuristic that includes:

- In action 515, determine whether there are many keyrigs, (e.g., >50) and whether a fast recovery is needed. If this is the case, then in an action 525, select a search strategy of performing a best match (on Bag-of-Words features) among the keyrigs, and using the best-matched keyrig's pose as end-result.
- In an action 535, it is determined whether the system was well on-track before lost. If this is the case, then in an action 545, select a search over limited to the local keyrigs (e.g., most recent X keyrigs) for fast recovery.
- In an action 555, determine whether the system needs multiple hypotheses before further refinement. If this is the case, then in action 565, select a search strategy that includes using the few best matches (on Bag-of-Words features).
- In an action 575 a default search strategy is selected in the event that a situation is encountered that does not meet criterion specified by at least one of the heuristics. Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

Geometric information obtained by 3D feature-based tracking is used to construct a hybrid grid that represents the features in a map useful in guiding a mobile device. The process of performing this task is described next with reference to examples depicted by FIGS. 8, 9 and 10.

Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the visual-inertial sensor's 200 coordinate to the map coordinate at the current time) and its uncertainty; and (iii) a sequence of IMU readings starting from a first temporal point before the timestamp to a second temporal point after the timestamp. Some implementations further include a flag to specify whether the visual-inertial sensor 200 is moving or static. This flag can be set from information obtained from the IMU readings.

Hybrid Representation

Implementations represent the spatial information perceived by a 3D feature-based mapping system and optionally an active ranging sensor (placed in parallel to the ground plane) using a hybrid point grid representation. One example implementation of a hybrid point grid representation combines a descriptive point cloud and a multi-layer 2D occupancy grid map.

Figure 6:
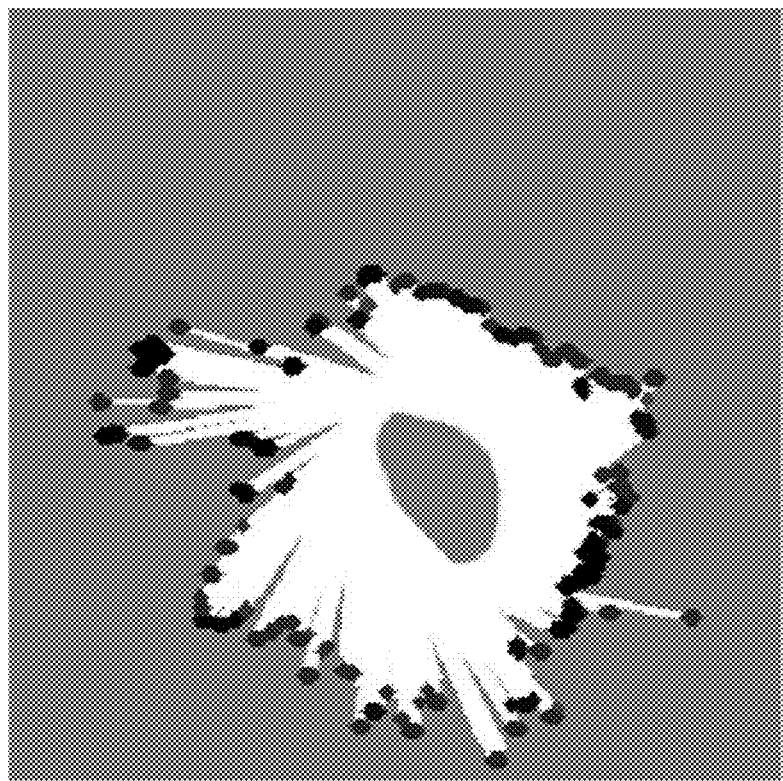
FIG. 6 illustrates an example of an occupancy grid map in one implementation.
Figure 6:
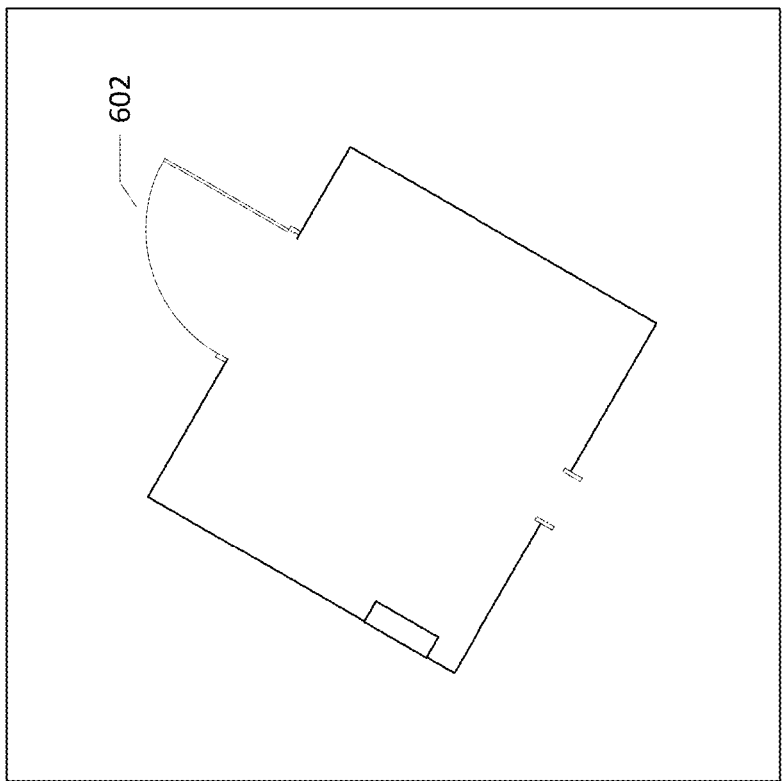

The occupancy grid map can be a plane oriented substantially perpendicular to the direction of gravity. Each layer has a specific height. (The layer on the floor is typically 0 according to one convention.). FIG. 6 illustrates an example of an occupancy grid map in one implementation. Occupancy grid 600 of FIG. 6 indicates a single layer, such as a floor layer 602, mapped by an implementation of the visual-inertial sensor 200. The white portions of occupancy grid 600 indicate empty space—in other words space that has been determined by visual-inertial sensor 200 to be unoccupied. For example, when visual-inertial sensor 200 is able to look through the room door and window to note space beyond the walls of the room that is unoccupied, these regions are marked accordingly in occupancy grid 600. Portions in solid black indicate space that is occupied by an object or obstacle. The gray portions indicate space that the visual-inertial sensor 200 has not yet determined whether these spaces are occupied or empty.

A 3 degrees of freedom transform that relates the descriptive point cloud coordinates to the gravity-based coordinates. For example, if the normal vector of the ground plane (i.e., gravity) is known, first rotate the point cloud so that the z-axis of the point cloud is parallel to the gravity, using a 3-by-3 rotation matrix R=R_pitch*R_roll. Then, (optionally) translate the point by [0, 0. T_z] so that the z=0 is on the ground plane. Note, a normal 3-by-3 rotation matrix has 3 degrees of freedom (R_yaw,*R_pitch*R_roll), however in this case are only 2 degrees. A normal 3-by-1 translation has 3 degrees of freedom ([t_x, t_y, t_z]), but here there is only 1 degree.

Creating a Point Cloud for Features Representation

Implementations incrementally create a descriptive point cloud from the results of 3D feature-based tracking by adding keyrigs according to a criterion, such as in a following example. Result of 3D feature based tracking is received in sets of image data that include feature points and pose information. The pose information includes a location of the mobile device and view of the camera that captured the image data. These sets are referred to collectively as keyrigs. Accordingly, an implementation builds a descriptive point cloud by selecting keyrigs using one or more criteria such as for example the following:

- The first image frame is selected as a keyrig, and the device coordinate frame at that timestamp become the coordinates of the descriptive point cloud. This establishes a frame of reference.
- The latest keyrig's timestamp is less than current timestamp for a time threshold (typically 2 sec).
- The distance between the current tracked pose to the latest keyrig's location is larger than a threshold (e.g., x meters).
- The distance between the current tracked pose to the latest keyrig's pointing angle is larger than a threshold (e.g., y degrees)
- The current image contains a percentage of features not included in the current descriptive point cloud.
- The device is currently static. This information can be obtained from inertial information from the IMU's signals.

If the keyrig being considered for addition contains features not included in the current descriptive point cloud, triangulate the new features from images captured from the device at this timestamp to obtain the points in the device's coordinate frame. Add the new points to the map by transforming the points from the device's coordinate frame to the map's coordinate frame. Noteworthy is that some implementations include one or more of (i) triangulating new feature points across images from a current/same keyrig (e.g. between left and right cameras), (ii) triangulating new feature points across images from two different keyrigs, wherein the two different keyrigs are not necessarily in sequence (e.g. left camera from keyrig 1 to left camera from keyrig 10), and (iii) triangulating new feature points from images in keyrigs chosen based upon a criterion (e.g., smart selection of an "optimal" keyrig). The transform is determined using feature-based tracking or other methods.

Refining a Point Cloud

In one implementation, a descriptive point cloud from the 3D feature-based tracking is refined by obtaining an "optimal" (i) pose of each keyrig and (ii) 3D locations of all the points that minimizes weighted sum of re-projection errors of all the points projected to their observed keyrigs, and (iii) optionally, the accelerometer readings from keyrigs with static flag must be [0, 0, 1] to force the z-axis of the map coordinate to be closer to gravity direction, while fulfilling the following constraint (if applicable): the pose moves along a plane (if the device is mounted on a vehicle with planar motion).

In one implementation, refining a descriptive point cloud from the 3D feature-based tracking is performed with limited computation resources by the following processing:
  Randomly sample N number of keyrigs from the entire set of keyrigs.
  Accurately refine the pose of the sample set of keyrigs and the 3D points observed in these keyrigs by minimizing the weighted sum of the (i) re-projection errors of all the points projected to their observed keyrigs, and (ii) optionally, the accelerometer readings from keyrigs with static flag must be [0, 0, 1] to force the z-axis of the map coordinate to be closer to gravity direction, while fulfilling the following constraints (if applicable): the pose moves along a plane (if the device is mounted on a vehicle with planar motion).
  Repeat the sampling and minimizing except fixing the 3D points and the poses that have already been optimized from the previous iteration.
  Iterate until a desired percentage of keyrigs and points are optimized.

Creating a Hybrid Point Grid

In one implementation, an initial hybrid point grid representation is created from a descriptive point cloud using the following processing:
  Transform the descriptive point cloud from its original coordinate frame to a coordinate frame where z-axis is along the gravity direction. This transformation has 2 degrees of freedom (in rotation).
  Initialize a 2D occupancy grid map for layers that cover the x-y points in the descriptive point cloud.
  Each layer of the occupancy grid map is filled in by points (in the descriptive point cloud) within a height range using ray tracing process.

Refining a Hybrid Point Grid

In one implementation, the hybrid point grid representation is refined using information from active sensors using the following processing:
  Obtain the pose, (transform from the device coordinate to the map's coordinate) where each active sensor's signal is captured, from the trajectory of the device in the map's coordinate frame.
  Use ray tracing process to update the 2D occupancy grid map.

In one implementation, the refining hybrid point grid representation from an updated descriptive point cloud is performed using the following processing:
  Transform the descriptive point cloud's coordinate frame to the gravity-based coordinate frame.
  Use ray tracing process to determine which cells to update from each point in the descriptive point cloud.

Estimating a Trajectory for a Guided Device

Figure 7:
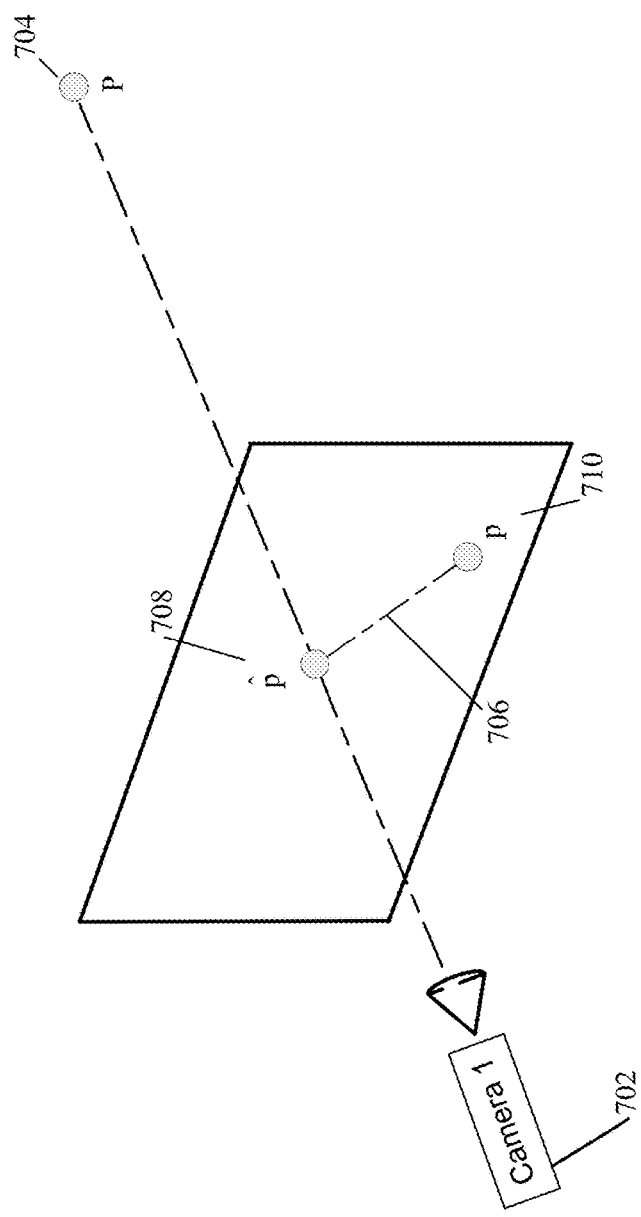
FIG. 7 illustrates an example of reprojection error.

In one implementation, an offline trajectory of a device between two consecutive keyrigs (i.e. from keyrig k to keyrig k+1) in a descriptive point cloud is estimated using the following processing:
  Initialize the image frame that creates keyrig k to be at its pose stored in the descriptive point cloud.
  Use the "3D feature-based tracking process" as described herein under section heading "Tracking" to track the image frames between the two keyrigs. Each image frame has a 6-degrees of freedom pose, and a set of correspondences of 3D map point to 2D image observed location.
  Force the image frame that creates keyrig k+1 to be at its pose stored in the descriptive point cloud.
  Refine all the poses by minimizing the sum of reprojection errors of all observed locations. The reprojection error is the error between a reprojected point in the camera coordinate frame and the original point. FIG. 7 illustrates an example of reprojection 700. In FIG. 7, some points in the reference frame of camera 702 are used to triangulate one or more new 3D points P 704 in the world coordinate frame. Due to errors in the calibration of the camera(s) 702, the spatial position of point P 704 will not be completely accurate. The reprojection error 706 can be determined from the resulting 3D point P 704 re-projected into the coordinates of the camera 602 (using the calibration data for the camera), obtaining a new point p̂ 708 near the originally projected p 710. The reprojection error 706 is the straight line distance between the original point p 710 and the reprojected point p̂ 708.

Estimating a Transform for a Descriptive Point Cloud and Gravity Based Frame

In one implementation, the 2 degrees of freedom coordinate transform between the descriptive point cloud to a coordinate where z-axis is along the gravity direction is estimated using any of the following methods:
  Measuring the gravity direction from IMU (accelerometer) while it is static, and find a rotation matrix that transforms the gravity direction to [0, 0, 1].
  Obtain at least 3 points on the ground-plane from the descriptive point cloud to estimate the ground-plane's normal in the original coordinate. Find a rotation matrix that transforms the ground-plane's normal to [0, 0, 1] or [0, 0, −1].
  Offline calibrate the relation between the visual-inertial sensor 200 to the ground by placing a known planar pattern on the ground to determine the rotation matrix.

Robot Implementation

Figure 8:
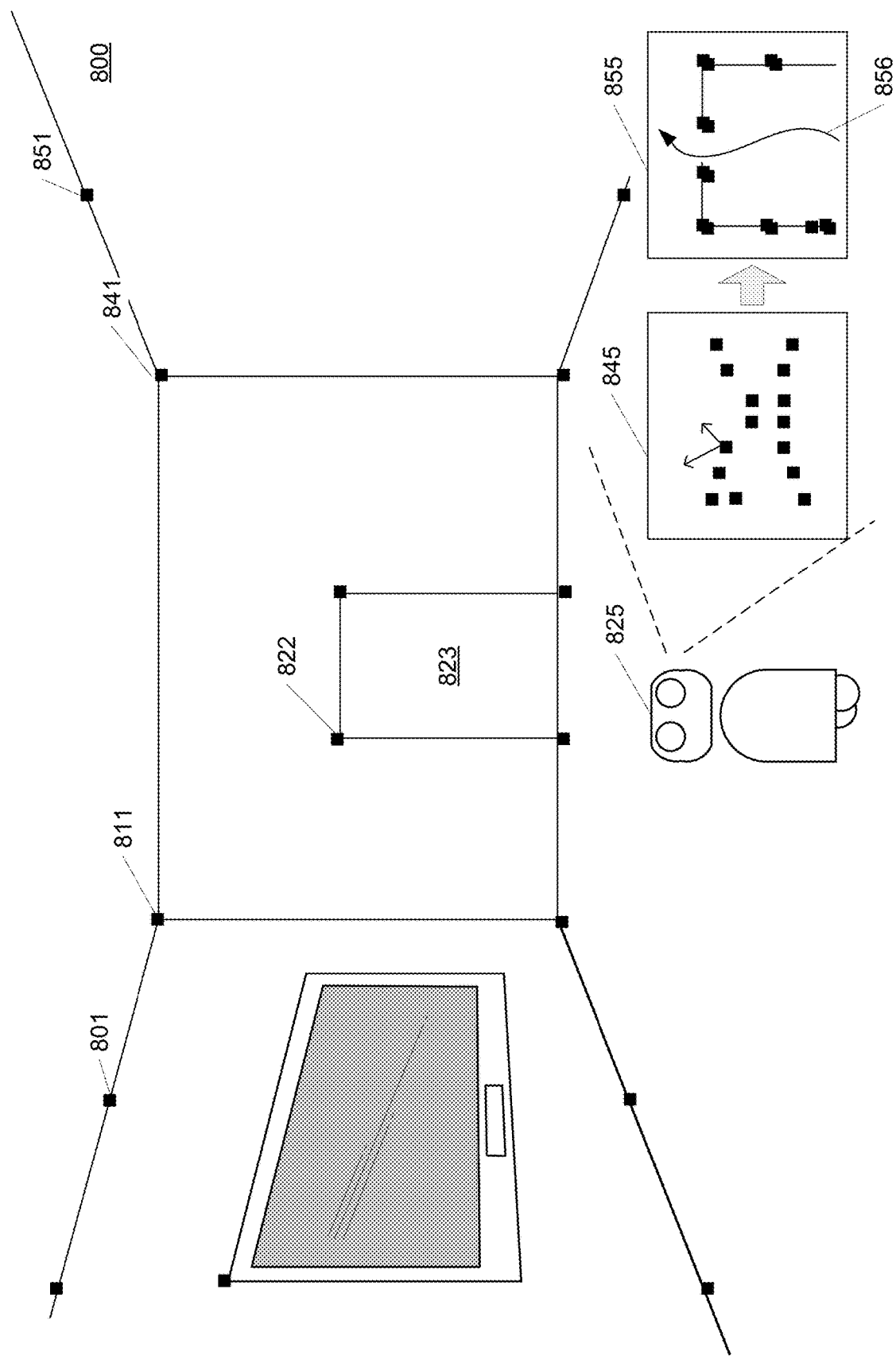
FIG. 8 illustrates an example robot guidance application in which one implementation can be embodied.

FIG. 8 illustrates an example model of robot guidance using image and inertial information techniques described herein. Examples of robot applications that benefit from employing positional awareness techniques such as described herein include:
  Caregiver and Service robots (traveling on a ground plane)
  A robot vacuuming/mopping/cleaning the floor.
  A robot being commanded to carry objects around the environment.
  A telepresence robot moving around a remote environment automatically.
  A robot butler that follows a person around.

In each of the scenarios listed above, the robot utilizes the technology disclosed herein in order to track its own location and to recognize the objects that it encounters. Also, since the robot performs many complex tasks, each with real-time constraints, it is beneficial that the sensing be done rapidly to accelerate the perception pipeline. In implementations, this can be achieved by offloading some computation from the main processor to the visual-inertial sensor 200. In addition, since it is a mobile robot, which carries limited storage capacity battery, energy consumption is a design point. In implementations, some computational tasks are off loaded from the main processor to the visual-inertial sensor 200 to reduce power consumption, thereby enabling implementations to achieve overall energy efficiency. Cost is an issue in mobile robots, since lowering the cost of the robot makes the robot affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

In FIG. 8, the walls, corners and door 823 of room 800 as well as the travels of service robot 825 on the floor of room 800 are reflected in the hybrid point grid, comprised of descriptive point cloud 845 and occupancy grid 855, developed by the visual-inertial sensor 200 using the technology described herein above in the Mapping section. The occupancy grid 855 is a part of the hybrid point grid that is a layer of the multi-layer 2D occupancy grid map described in the Mapping section. To build a map of an unknown (newly exposed) environment, the visual-inertial sensor 200 equipped robot 825 keeps track of its pose using the technology described herein above in the Tracking section while incrementally building an initial descriptive point cloud using the technology described herein above in the Mapping section. Then, the robot 825 builds an occupancy grid 855 to complete the hybrid point grid from the initial descriptive point cloud 845 using the technology described herein above in the Mapping section.

Obtain Real Time Image and Inertial Information

In order to track its location, the robot senses its own movement through visual-inertial sensor 200. The visual-inertial sensor 200 generates reliable inertial data so that the tracking and mapping pipeline that follows can accurately infer the robot's location. FIG. 8 illustrates an example robot guidance application in which one implementation can be embodied. As illustrated by FIG. 8, robot 825 implements visual-inertial sensor 200 to self-localize within a room 800. The robot 825 in FIG. 8 employs the cameras 208, 210 of a visual sensor 200 in order to capture image frames of the surrounding environment of room 800. The images are processed according to the technology disclosed herein above under the Sensor Visual Data Generation and Processing section as follows:

Detect and Describe Features in Captured Images

Visual-inertial sensor 200 determines feature points 801, 811, 841, 851, 822, and so forth for the walls, corners and door 823 of room 800 from the information in the captured image frames. In some implementations, Shi-Tomasi feature detection is employed to determine the feature points 801, 811, 841, 851, 822 from the image frames. Features are assigned descriptors using ORB feature description. Optical flow techniques are used to determine 2D correspondences in the images, enabling matching together features in different images.

Map Feature Descriptors to a Hybrid Point Grid

The visual-inertial sensor 200 equipped robot 825 can build a descriptive point cloud 845 of the obstacles in room 800 enabling the robot 825 to circumnavigate obstacles and self-localize within room 800. Visual-inertial sensor 200 creates, updates, and refines descriptive point cloud 845 using feature descriptors determined for room features indicated by points 801, 811, 841, 851, 822 using the technology disclosed herein above under the Mapping sections. As depicted schematically in FIG. 8, descriptive point cloud 845 includes coordinates and feature descriptors corresponding to the feature points 801, 811, 841, 851, 822 of room 800. Visual-inertial sensor 200 prepares an occupancy map 855 by reprojecting feature points 801, 811, 841, 851, 822 onto a 2D layer corresponding to the floor of the room 800. In some implementations, second and possibly greater occupancy maps are created at differing heights of the robot 825, enabling the robot 825 to navigate about the room 800 without bumping its head into door soffits, or other obstacles above the floor.

Now with renewed reference to FIG. 6, which illustrates an example of an occupancy grid 600, the white portions indicate empty space—in other words space that has been determined by visual-inertial sensor 200 to be unoccupied. Portions in solid black indicate space that is occupied by an object or obstacle. The gray portions indicate space that the visual-inertial sensor 200 of robot 825 has not yet determined whether these spaces are occupied or empty.

The descriptive point cloud 845 and occupancy grid 855 comprise a hybrid point grid that enables the robot 825 to plan paths of travel through room 800, using the occupancy grid 855 and self-localize relative to features in the room 800 using the descriptive point cloud 845.

Using the Occupancy Grid and Path Planning

When the robot is activated in a previously mapped environment, the robot uses the technology described herein above in the Tracking sections to self-locate within the descriptive point cloud 845. The descriptive point cloud 845 and occupancy grid 855 comprise a hybrid point grid representation that is key to enabling robot action (i.e. moving on the floor) using passive sensors because the robot uses the occupancy grid 855 in order to plan a trajectory 856 from its current location to another location in the map using the technology described herein above in the Mapping sections. A person or entity can also command the robot to go to a specific point in the occupancy grid 855. While traveling, the robot uses the descriptive point cloud 845 to localize itself within the map as described herein above in the Tracking sections. The robot can update the map using the techniques described herein above in the Mapping sections. Further, some implementations equipped with active sensors (e.g. sonar, lidar) can update the map using information from these sensors as well.

VR/AR Implementations

Figure 9:
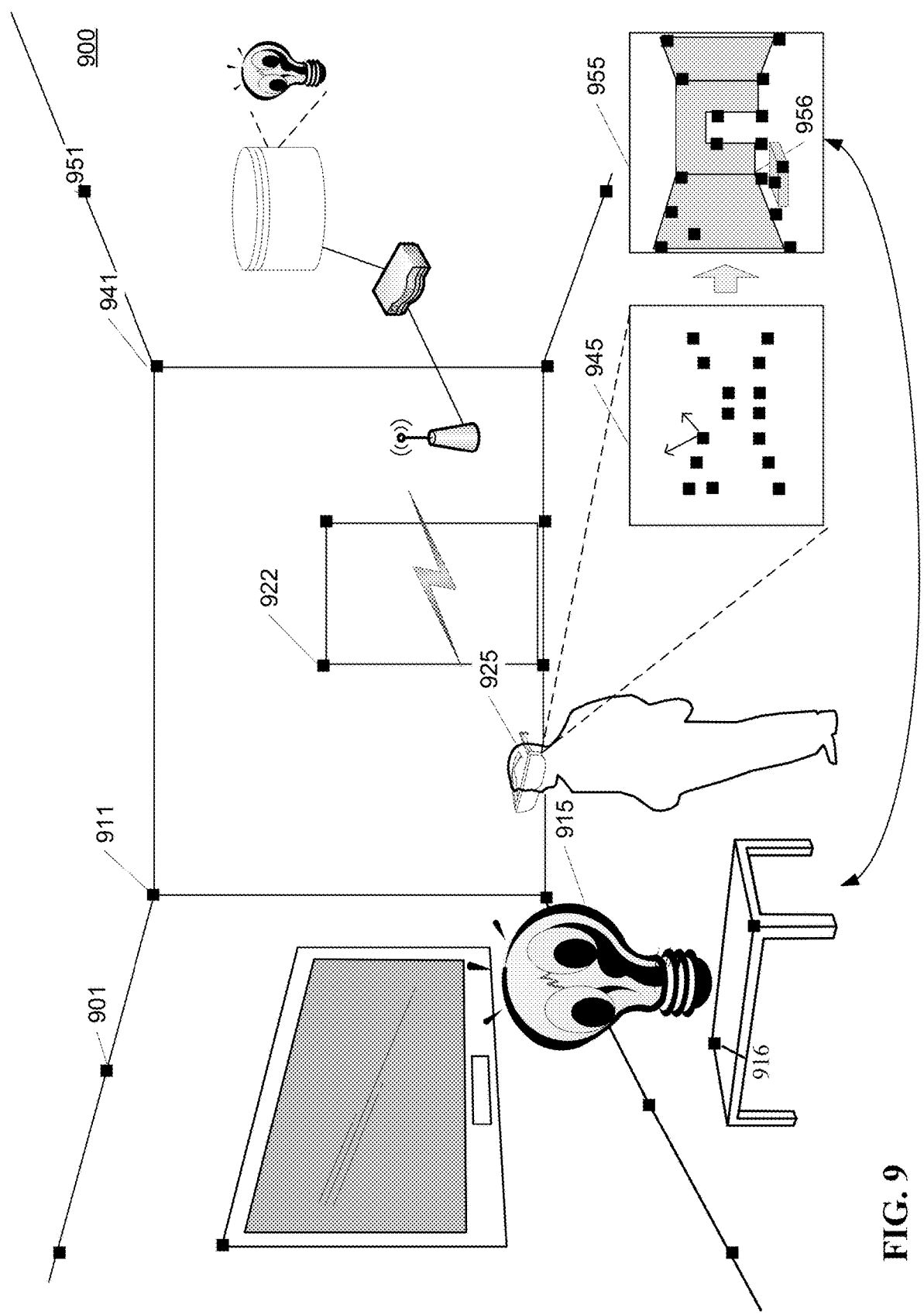
FIG. 9 illustrates an example VR application in which one implementation can be embodied.

In both AR and VR usage scenarios, the headset, goggles or other VR/AR presentation device employs the visual-inertial sensor 200 to track its own location, and in some applications recognizes the objects that it encounters. In order to track its location, the VR/AR presentation device needs to sense its own movement, which is accomplished using the visual-inertial sensor 200 technology described herein. Accordingly, the visual-inertial sensor 200 generates reliable inertial data so that the tracking and mapping pipeline that follows can accurately infer the VR/AR presentation device's location. FIG. 9 illustrates an example VR application in which one implementation can be embodied.

In FIG. 9, a user wears a VR/AR presentation device, headset 925. Headset 925 is equipped with a visual-inertial sensor 200 creates, updates, and refines descriptive point cloud 945 using feature descriptors determined for room features indicated by points 901, 911, 941, 951, 922 of room 900 and points 916 of objects within room 900 using the technology disclosed herein above under the Mapping sections. As depicted schematically in FIG. 9, descriptive point cloud 945 includes coordinates and feature descriptors corresponding to the feature points 901, 911, 941, 951, 922 of room 900 and points 916 of objects within room 900. Visual-inertial sensor 200 prepares hybrid point grid 955 of the room 900 mapping space by reprojecting feature points 901, 911, 941, 951, 922 and 916 onto 2D layers corresponding to various heights above (and including) the floor where feature points were found within the room 900. Accordingly, hybrid point grid 955 provides a mapping of the space in room 900 by stacked 2D layers indicating feature points corresponding to boundaries and objects in the room 900. In some implementations, free space 956 can be identified by the visual-inertial sensor 200 as available for display of VR presentation 915 and communicated to the VR presentation mechanisms of headset 925 enabling headset 925 to appropriately render VR presentation 915 to appear within space 956 to the wearer.

Headset 925 can be communicatively coupled to a source of content for presenting VR presentation 915 to the wearer. While depicted as a wireless connection to a hotspot coupled to a network gateway that further couples to a source of content for VR presentation 915, headset 925 can be coupled to presentation content using any of a wide variety of mechanisms, wired or wireless. Further, presentation content for rendering VR presentation 915 can be downloaded and stored on some headset 925 implementations.

The foregoing operational principles are easily applied to other common VR applications such as gaming and socially enabled experiences. In gaming for example, game play is conducted by users while wearing a VR/AR presentation device. The game is displayed to a user ("gamer") by the VR/AR presentation device. The visual-inertial sensor 200 equipped VR/AR presentation device conducts orientation tracking, translation movement of the gamer that can be reflected to the game displayed by the VR/AR presentation device, enabling the gamer to move freely within a certain area of surrounding space. A visual-inertial sensor 200 equipped VR/AR presentation device provides mobile VR games with such "inside-out" e.g., integrated within the VR/AR presentation device, tracking thereby obviating the need for some kind of external position sensors such as are required by conventional VR/AR headsets. Yet further, if the gamer uses the VR/AR presentation device frequently in the same area, e.g., the gamer's living room, the visual-inertial sensor 200 can smartly re-use or update an existing (e.g., previously created by the visual-inertial sensor 200) map of this space to provide position tracking.

In socially enabled experiences for example, a celebrity/sports star/singer (creator) performs live in front of a stereo video camera that provides a live video stream as content to fans. Fans wearing a VR/AR presentation device equipped with the visual-inertial sensor 200 (attached or embedded) can consume this live video feed as a VR presentation. When the fans get excited/sad/happy, they move about just as they would during an in person live experience. The visual-inertial sensor 200 performs position tracking, and provides input to the VR/AR presentation device enabling adjusting the live video feed accordingly based on the position tracking. Accordingly, the fans and creator can "interact" with the help of the disclosed technology.

Figure 10:
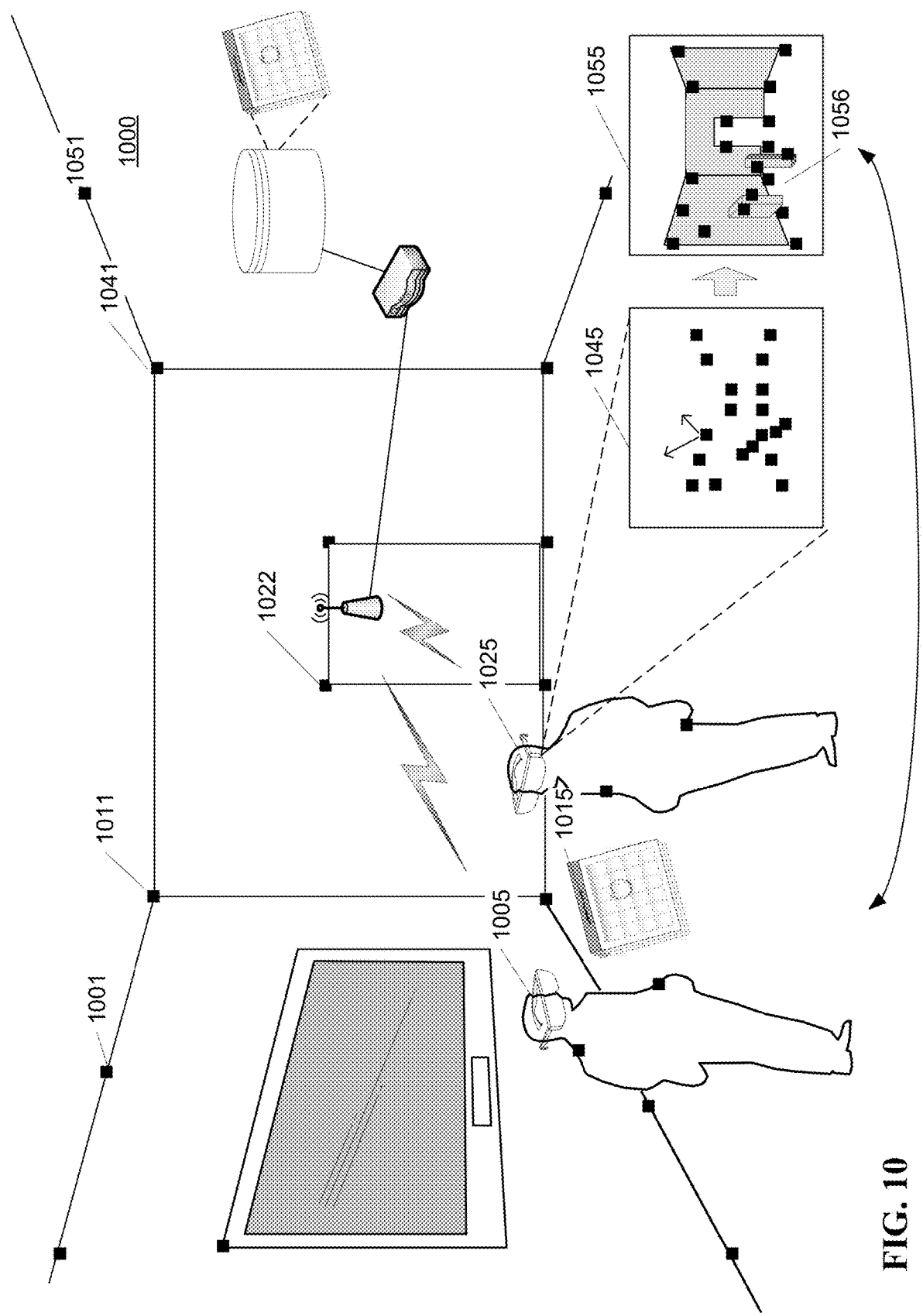
FIG. 10 illustrates an example AR application in which one implementation can be embodied.

FIG. 10 illustrates an example AR application in which one implementation can be embodied. In FIG. 10, two users wear VR/AR presentation devices, headsets 1005, 1025. Headsets 1005, 1025 are equipped with a visual-inertial sensor 200 that creates, updates, and refines descriptive point cloud 1045 using feature descriptors determined for room features indicated by points 1001, 1011, 1041, 1051, 1022 of room 1000 using the technology disclosed herein above under the Mapping sections. As depicted schematically in FIG. 10, descriptive point cloud 1045 includes coordinates and feature descriptors corresponding to the feature points 1001, 1011, 1041, 1051, 1022 of room 1000. Visual-inertial sensor 200 prepares hybrid point grid 1055 of the room 1000 mapping space by reprojecting feature points 1001, 1011, 1041, 1051, 1022 of room 1000 onto 2D layers corresponding to various heights above (and including) the floor where feature points were found within the room 1000. Accordingly, hybrid point grid 1055 provides a mapping of the space in room 1000 by stacked 2D layers indicating feature points corresponding to boundaries and objects in the room 1000. In some implementations, objects 1056 corresponding to the wearers can be identified by the visual-inertial sensor 200 of the other wearer and reflected in hybrid point grid 1055. Further, free space between the objects 1056 corresponding to the wearers is made available for display of AR presentation 1015, in this case a virtualized rendering of a project schedule that the wearers are discussing during a business meeting, and communicated to the VR/AR presentation mechanisms of headsets 1005, 1025, enabling the headsets 1005, 1025 to appropriately render AR presentation 1015 to appear within space between objects 1056 corresponding to the wearers.

Headsets 1005, 1025 can be communicatively coupled to a source of content for presenting AR presentation 1015 to the wearer(s). While depicted as a wireless connection to a hotspot coupled to a network gateway that further couples to a source of content for AR presentation 1015, headsets 1005, 1025 can be coupled to presentation content using any of a wide variety of mechanisms, wired or wireless. Further, presentation content for rendering AR presentation 1015 can be downloaded and stored on some headsets 1005, 1025 implementations.

The foregoing operational principles are easily applied to other common AR applications such as gaming, socially enabled experiences and industrial applications. Like VR gaming, in AR gaming, game play is conducted by users while wearing a VR/AR presentation device. Gamers can move freely about the room(s) while the visual-inertial sensor 200 equipped VR/AR presentation device tracks the gamer' position. The VR presentation device manages positioning virtual things in the real world environment because of the accurate mapping of the real world environment provided by the visual-inertial sensor 200. Accordingly, the AR gamer can participate in virtual battles in their own living room, accouter their kitchen with virtual overlays of $18^{th}$ century kitchen items and so forth. Each virtual item can be positioned accurately and realistically into the gamer's real world using the position and localization information provided by the virtual-inertial sensor 200.

In socially enabled experiences for example, video chat applications for VR can enable a user to conduct a video chat with their best friend Tom, and a virtual Tom (displayed using an AR goggles, VR headset, projected by robot or other presentation rendering devices) appears in a position of the user's house. The user can walk around virtual Tom, change the presentation—making him larger or smaller or even changing the rendering altogether clothing him in a hat and suit typically worn by Napoleon.

Many other applications of virtual-inertial sensor 200 equipped VR/AR presentation devices exist. Virtual shopping trips, remote real estate showings, bicycle rides captured and replayed during indoor cycling sessions, virtual flight instruction, indoor/outdoor position tracking for hikes, bike rides, motorcycle travel and so forth.

In each of the scenarios listed above, the VR/AR presentation device utilizes the technology disclosed herein in order to track its own location and to recognize the objects that it encounters. Also, since the VR/AR applications include many complex tasks, each with real-time constraints, it is beneficial that the sensing be done rapidly to accelerate the perception pipeline. In implementations, this can be achieved by offloading some computation from the main processor to the visual-inertial sensor 200. In addition, since many VR/AR presentation devices can be wearable—or at least portable—the VR/AR presentation device carries limited storage capacity battery, energy consumption is a design point. In implementations, some computational tasks are off loaded from the main processor to the visual-inertial sensor 200 to reduce power consumption, thereby enabling implementations to achieve overall energy efficiency. Cost is an issue in VR/AR applications, since lowering the cost of the VR/AR presentation device makes VR/AR affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

Processes

Figure 11:
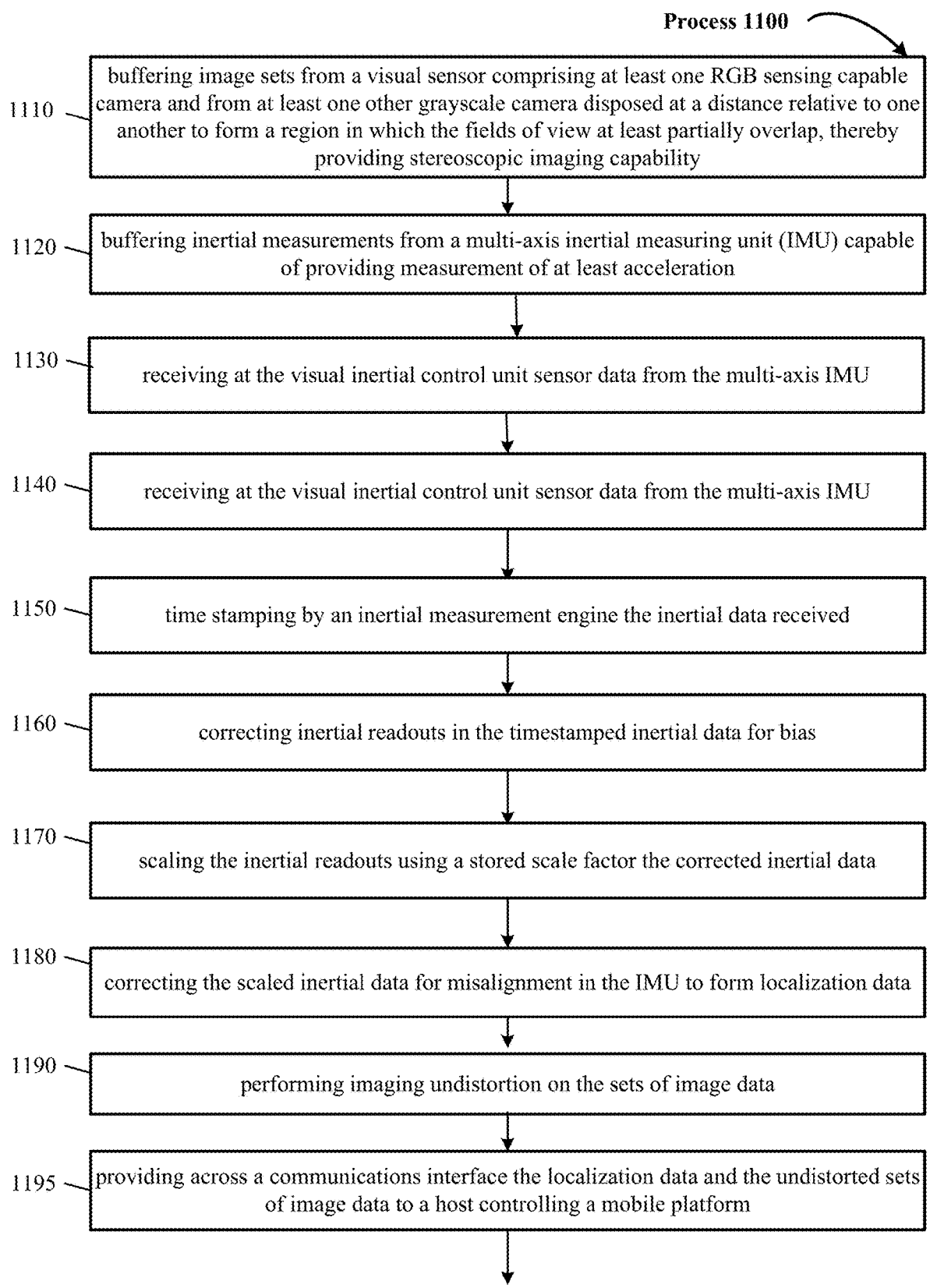
FIG. 11 is a representative method of guiding a mobile device using information from a camera with distance calculation and multi-axis inertial measuring unit (IMU).

FIG. 11 is a representative method 1100 of guiding a mobile device using information from a camera with distance calculation and multi-axis inertial measuring unit (IMU). Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 11 includes process 1100 that begins at action 1110, where image sets from a visual sensor are buffered. In some implementations, image sets are received from a visual sensor comprising at least one RGB sensing capable camera and from at least one other grayscale camera. The RGB camera(s) and grayscale camera(s) can be disposed at a distance relative to one another to form a region in which the fields of view at least partially overlap, thereby providing stereoscopic imaging capability. The visual sensor is disposed on a mobile platform, such as a robot, autonomous vehicle, or other autonomous or guided mobile platform.

Process 1100 continues at action 1120 where inertial measurements from a multi-axis inertial measuring unit (IMU) capable of providing measurement of at least acceleration are buffered. The inertial measuring unit can be collocated with the visual sensor or can be disposed at an offset thereto.

At action 1130, the sets of image data are received at a visual inertial control unit.

At action 1140, the sets of sensor data from the multi-axis IMU are received at a visual inertial control unit.

At action 1150, the inertial data received is timestamped. The time stamping can be performed by an inertial measurement engine.

At action 1160, inertial readouts in the timestamped inertial data are corrected for bias.

At action 1170, the inertial readouts are scaled using a stored scale factor the corrected inertial data.

At action 1180, the scaled inertial data are corrected for misalignment in the IMU to form localization data.

At action 1190, imaging undistortion is performed on the sets of image data.

At action 1195, the localization data and the undistorted sets of image data are provided across a communications interface to a host controlling a mobile platform.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 12:
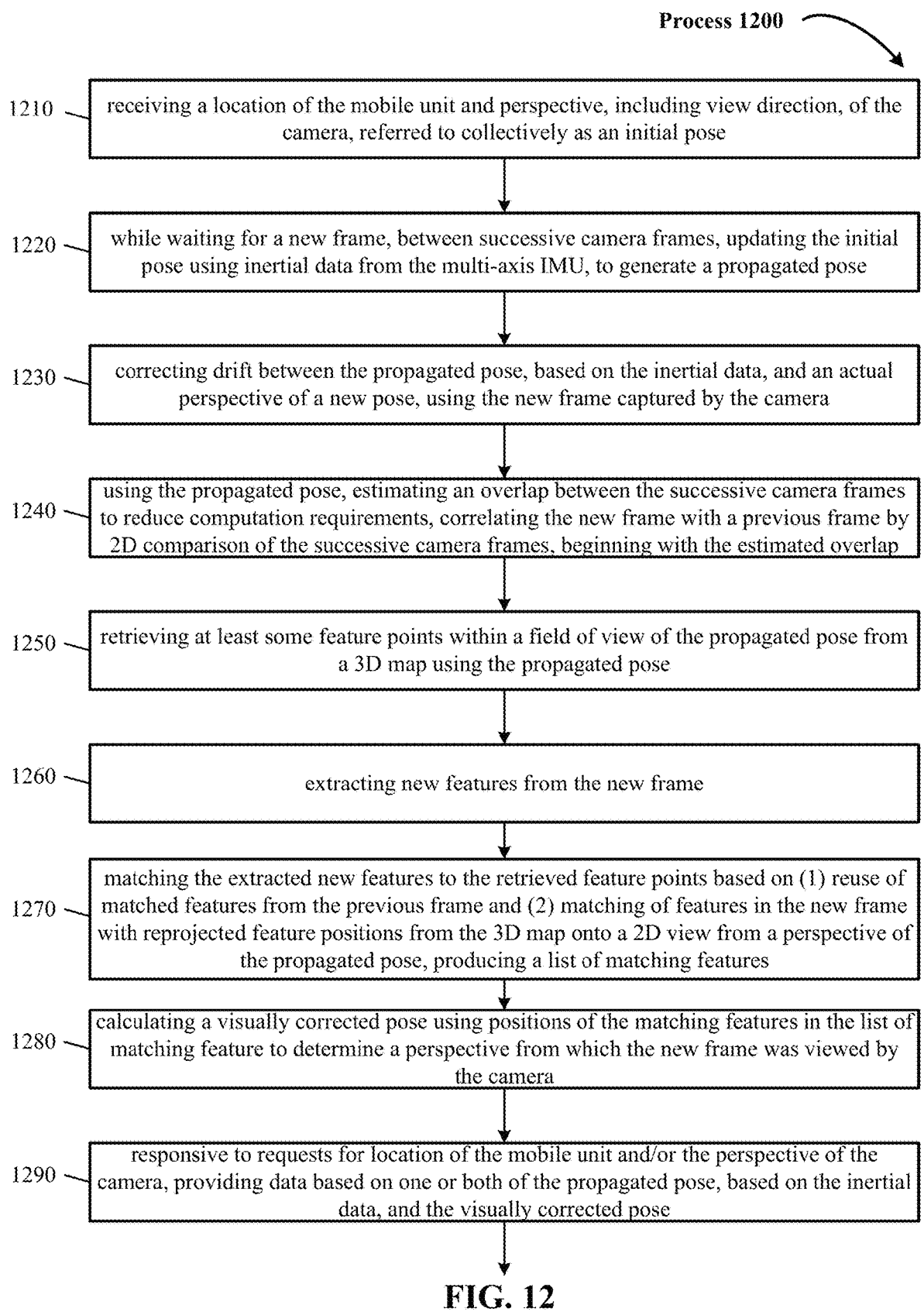
FIG. 12 is a representative method of updating a position of a mobile unit that includes a camera with distance calculation and multi-axis inertial measuring unit (IMU).

FIG. 12 is a representative method 1200 of updating a position of a mobile unit that includes a camera with distance calculation and multi-axis inertial measuring unit (IMU). Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 12 includes process 1200 that begins at action 1210, where a location of the mobile unit and perspective, including view direction, of the camera, referred to collectively as an initial pose is received. In some implementations, initial pose representations include coordinate e.g., points (x, y, z) mapped to a coordinate system of a visual-inertial sensor disposed on a mobile platform, such as a robot, autonomous vehicle, or other autonomous or guided mobile platform.

Process 1200 continues at action 1220 where while waiting for a new frame, between successive camera frames, the initial pose is updated using inertial data from the multi-axis IMU, to generate a propagated pose.

At action 1230, drift between the propagated pose, based on the inertial data, and an actual perspective of a new pose, is corrected using the new frame captured by the camera. This action can include a number of actions as well:

At action 1240, using the propagated pose, an overlap between the successive camera frames is estimated to reduce computation requirements, and the new frame is correlated with a previous frame by 2D comparison of the successive camera frames, beginning with the estimated overlap.

At action 1250, at least some feature points within a field of view of the propagated pose are retrieved from a 3D map using the propagated pose.

At action 1260, new features are extracted from the new frame.

At action 1270, the extracted new features are matched to the retrieved feature points based on (1) reuse of matched features from the previous frame and (2) matching of features in the new frame with reprojected feature positions from the 3D map onto a 2D view from a perspective of the propagated pose, producing a list of matching features.

At action 1280, a visually corrected pose is calculated using positions of the matching features in the list of matching feature to determine a perspective from which the new frame was viewed by the camera.

At action 1290, responsive to requests for location of the mobile unit and/or the perspective of the camera, data based on one or both of the propagated pose, based on the inertial data, and the visually corrected pose is provided.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 13:
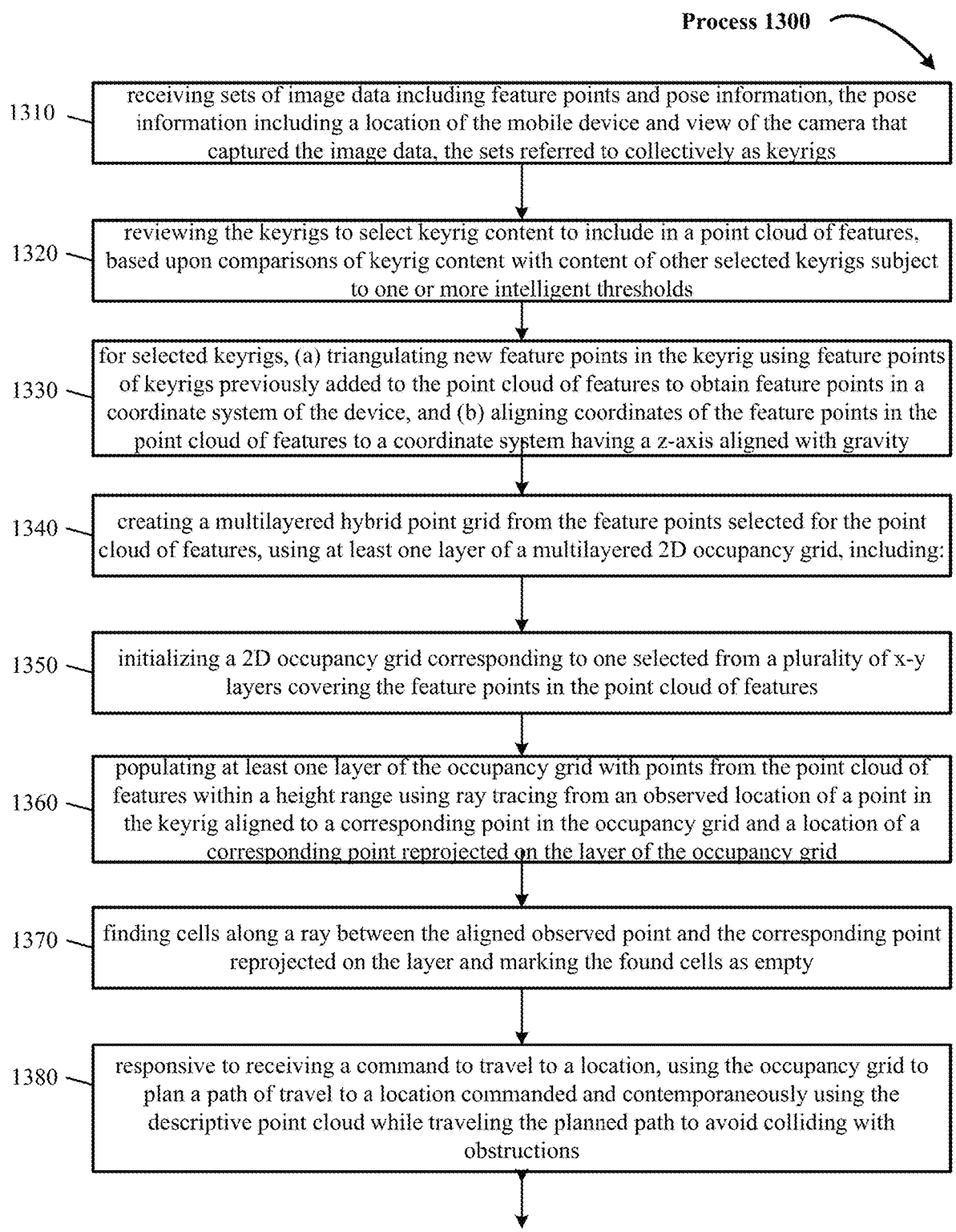
FIG. 13 is a representative method of using a hybrid point grid to guide a mobile device that includes a camera with distance calculation and multi-axis inertial measuring unit (IMU).

FIG. 13 is a representative method 1300 of using a hybrid point grid to guide a mobile device that includes a camera with distance calculation and multi-axis inertial measuring unit (IMU). Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 13 includes process 1300 that begins at action 1310, where sets of image data are received. In some implementations, the sets of image data include feature points and pose information. The pose information includes a location of the mobile device and view of the camera that captured the image data. The sets of image data are referred to collectively as keyrigs.

Process 1300 continues at action 1320 where the keyrigs are reviewed to select keyrig content to include in a point cloud of features, based upon comparisons of keyrig content with content of other selected keyrigs subject to one or more intelligent thresholds. As used herein, intelligent thresholds includes a threshold that is adaptively adjusted based upon device movement, sensor readings, situational or environmental variables (e.g., low light, fog, bright light, and so forth) or combinations thereof.

At action 1330, for selected keyrigs, (a) new feature points in the keyrig are triangulated using feature points of keyrigs previously added to the point cloud of features to obtain feature points in a coordinate system of the device, and (b) coordinates of the feature points in the point cloud of features are aligned to a coordinate system having a z-axis aligned with gravity.

At action 1340, a multilayered hybrid point grid is created from the feature points selected for the point cloud of features, using at least one layer of a multilayered 2D occupancy grid by the following:

At action 1350, a 2D occupancy grid corresponding to one selected from a plurality of x-y layers covering the feature points in the point cloud of features is initialized.

At action 1360, at least one layer of the occupancy grid is populated with points from the point cloud of features within a height range using ray tracing from an observed location of a point in the keyrig aligned to a corresponding point in the occupancy grid and a location of a corresponding point reprojected on the layer of the occupancy grid.

At action 1370, cells along a ray between the aligned observed point and the corresponding point reprojected on the layer are found and the found cells are marked as empty.

At action 1380, responsive to receiving a command to travel to a location, the occupancy grid is used to plan a path of travel to a location commanded and contemporaneously the descriptive point cloud is used while traveling the planned path to avoid colliding with obstructions.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Conclusion and Additional Implementations

We describe a system and various implementations for guiding a mobile device that includes a camera with distance calculation and multi-axis inertial measuring unit (IMU). Some additional implementations and features include:

In some implementations point cloud of features is refined by selecting sets of at least some of image data and pose information of the point cloud of features; reprojecting 3D points from the point cloud onto a 2D image plane using the pose information; calculating image coordinates for the reprojected points on the 2D image plane and comparing the calculated image coordinates for the reprojected points on the 2D image plane to actual coordinates of corresponding observed points obtained directly from the image data selected to compute a plurality of re-projection errors; and minimizing a weighted sum of the re-projection errors for the selected sets.

In some implementations sets of image data and pose information in which IMU readings for static images is [0,0,1 g] are selected, thereby aligning z-axis of the image data coordinates with gravity.

In some implementations minimizing further includes constraining the pose to moving along a plane when the mobile device is mounted on a vehicle with planar motion. Constraining can include applying a pose moving along a plane constraint to a cost function.

In some implementations a multilayered hybrid point grid is refined by determining an array between a point in the refined point cloud of features and a corresponding point located by a cell of an x-y layer of the occupancy grid such that the array is substantially parallel to a direction of gravity in a coordinate system of the occupancy grid; and marking the cell as containing an object; finding cells along the ray between the point in the refined point cloud of features and the corresponding point in the x-y layer of the occupancy grid and marking the cells found as empty; and finding cells between the point in the refined point cloud of features and a point from which the image data is captured and marking the cells as empty.

In some implementations pose information is provided with respect to a point cloud of features to track position of the mobile device that captured images used to build the point cloud of features.

In some implementations further include one or more of (i) triangulating new feature points across images from a current keyrig, (ii) triangulating new feature points across images from two different keyrigs, wherein the two different keyrigs are not necessarily in sequence, and (iii) triangulating new feature points from images in keyrigs chosen based upon a criterion.

Some particular implementations and features are described in the following discussion.

In one implementation, described is a system including a mobile platform having disposed on it at least one camera; a multi-axis inertial measuring unit (IMU); and an interface to a host. The host can include one or more processors coupled to a non-transitory memory, the memory loaded with computer instructions to guide the mobile platform that includes the camera with distance calculation and multi-axis IMU. When executed on the processor(s), the instructions implement various actions, for example, receiving sets of image data including feature points and pose information. The pose information includes a location of the mobile device and view of the camera that captured the image data. The sets are referred to collectively as keyrigs.

The keyrigs are reviewed to select keyrig content to include in a point cloud of features, based upon comparisons of keyrig content with content of other selected keyrigs subject to one or more intelligent thresholds.

For selected keyrigs, the system (a) triangulates new feature points in the keyrig using feature points of keyrigs previously added to the point cloud of features to obtain feature points in a coordinate system of the device, and (b) aligns coordinates of the feature points in the point cloud of features to a coordinate system having a z-axis aligned with gravity.

The system creates a multilayered hybrid point grid from the feature points selected for the point cloud of features, using at least one layer of a multilayered 2D occupancy grid, by: initializing a 2D occupancy grid corresponding to one selected from a plurality of x-y layers covering the feature points in the point cloud of features; populating at least one layer of the occupancy grid with points from the point cloud of features within a height range using ray tracing from an observed location of a point in the keyrig aligned to a corresponding point in the occupancy grid and a location of a corresponding point reprojected on the layer of the occupancy grid; and finding cells along a ray between the aligned observed point and the corresponding point reprojected on the layer and marking the found cells as empty.

Responsive to receiving a command to travel to a location, using the occupancy grid to plan a path of travel to a location commanded and contemporaneously using the descriptive point cloud while traveling the planned path to avoid colliding with obstructions.

Other implementations include methods including performing the actions of the system, non-transitory machine readable storage media storing program logic implementing such methods, substituents and components thereof, and devices incorporating any or combinations of the foregoing.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system including:
one or more processors coupled to memory loaded with computer instructions to provide guidance information to guide a mobile platform, which instructions, when executed on the processors, implement actions comprising:
selecting from a plurality of sets of image data, one or more sets of image data to include in a point cloud of features, wherein image data includes feature points determined from captured image data and pose information that includes a location and an orientation of a camera that captured the image data;
for selected sets of image data, (a) triangulating new feature points using feature points of sets of image data previously added to the point cloud of features to obtain feature points in a coordinate system of the mobile platform, and (b) aligning coordinates of the feature points in the point cloud of features to a coordinate system having a z-axis aligned with gravity;
creating a multilayered hybrid point grid from feature points selected for the point cloud of features, including at least one layer of a multilayered 2D occupancy grid; and
providing the at least one layer of a multilayered 2D occupancy grid to a process that plans a path of travel to a location.

2. The system of claim 1, further implementing actions comprising refining the point cloud of features by:
selecting sets of at least some of image data and pose information of the point cloud of features;
reprojecting 3D points from the point cloud of features onto a 2D image plane using the pose information;

calculating image coordinates for the 3D points as reprojected on the 2D image plane and comparing the image coordinates as calculated for the 3D points as reprojected on the 2D image plane to actual coordinates of corresponding observed points obtained directly from the image data selected to compute a plurality of re-projection errors; and minimizing a weighted sum of the re-projection errors as computed.

3. The system of claim 2, wherein the selecting further includes selecting image data and pose information in which IMU readings for static images is [0,0, 1 g] thereby aligning z-axis of the image coordinates with gravity.

4. The system of claim 2, wherein the minimizing further includes constraining a pose to moving along a plane when the mobile platform is mounted on a vehicle with planar motion.

5. The system of claim 4, wherein the constraining includes applying a pose moving along a plane constraint to a cost function.

6. The system of claim 2, further including refining the multilayered hybrid point grid by: using ray tracing, determining cells in each layer of the multilayered 2D occupancy grid to update based upon one or more points in the point cloud of features as refined by:

determining a ray between a point in the point cloud of features as refined and a corresponding point located by a cell of an x-y layer of the multilayered 2D occupancy grid such that the ray is substantially parallel to a direction of gravity in a coordinate system of the multilayered 2D occupancy grid; and marking the cell as containing an object;

finding cells along the ray between the point in the point cloud of features as refined and the corresponding point in the x-y layer of the multilayered 2D occupancy grid and marking the cells found as empty; and finding cells between the point in the point cloud of features as refined and a point from which the image data is captured and marking the cells as empty.

7. The system of claim 1, further including providing pose information with respect to the point cloud of features to track position of the mobile platform that captured images used to build the point cloud of features.

8. The system of claim 1, wherein the triangulating further includes one selected from (i) triangulating new feature points across images from a current set of image data, (ii) triangulating new feature points across images from two different sets of image data, wherein two different sets of image data are not necessarily in sequence, (iii) triangulating new feature points from images in sets of image data chosen based upon a criterion.

9. The system of claim 1, wherein creating a multilayered hybrid point grid further includes:

populating at least one layer of a 2D occupancy grid that corresponds to an x-y layer including at least some of the feature points in the point cloud of features, with points from the point cloud of features within a height range using ray tracing from an observed location of a point aligned to a corresponding point in the multilayered 2D occupancy grid and a location of a corresponding point reprojected on the layer of the multilayered 2D occupancy grid; and finding cells along a ray between the observed location of the point as aligned and the corresponding point reprojected on the layer and marking the any cells found as empty.

10. A method of providing guidance information to guide a mobile device including:

selecting from a plurality of sets of image data, one or more sets of image data to include in a point cloud of features, wherein image data includes feature points determined from captured image data and pose information that includes a location and an orientation of a camera that captured the image data;

for selected sets of image data, (a) triangulating new feature points using feature points of sets of image data previously added to the point cloud of features to obtain feature points in a coordinate system of the mobile device, and (b) aligning coordinates of the feature points in the point cloud of features to a coordinate system having a z-axis aligned with gravity;

creating a multilayered hybrid point grid from feature points selected for the point cloud of features, including at least one layer of a multilayered 2D occupancy grid; and providing the at least one layer of a multilayered 2D occupancy grid to a process that plans a path of travel to a location.

11. The method of claim 10, further including refining the point cloud of features by:

selecting sets of at least some of image data and pose information of the point cloud of features;

reprojecting 3D points from the point cloud of features onto a 2D image plane using the pose information;

calculating image coordinates for the 3D points as reprojected on the 2D image plane and comparing the image coordinates as calculated for the 3D points as reprojected on the 2D image plane to actual coordinates of corresponding observed points obtained directly from the image data selected to compute a plurality of re-projection errors; and minimizing a weighted sum of the re-projection errors computed.

12. The method of claim 11, wherein the selecting further includes selecting image data and pose information in which IMU readings for static images is [0,0,1 g] thereby aligning z-axis of the image coordinates with gravity.

13. The method of claim 11, wherein the minimizing further includes constraining a pose to moving along a plane when the mobile device is mounted on a vehicle with planar motion.

14. The method of claim 13, wherein the constraining includes applying a pose moving along a plane constraint to a cost function.

15. The method of claim 11, further including refining the multilayered hybrid point grid by: using ray tracing, determining cells in each layer of the multilayered 2D occupancy grid to update based upon one or more points in the point cloud of features as refined by:

determining a ray between a point in the point cloud of features as refined and a corresponding point located by a cell of an x-y layer of the multilayered 2D occupancy grid such that the ray is substantially parallel to a direction of gravity in a coordinate system of the multilayered 2D occupancy grid; and marking the cell as containing an object;

finding cells along the ray between the point in the point cloud of features as refined and the corresponding point in the x-y layer of the multilayered 2D occupancy grid and marking the cells found as empty; and finding cells between the point in the point cloud of features as refined and a point from which the image data is captured and marking the cells as empty.

16. The method of claim 10, further including providing pose information with respect to the point cloud of features to track position of the mobile device that captured images used to build the point cloud of features.

17. The method of claim 10, wherein the triangulating further includes one selected from (i) triangulating new feature points across images from a current set of image data, (ii) triangulating new feature points across images from two different sets of image data, wherein two different sets of image data are not necessarily in sequence, (iii) triangulating new feature points from images in sets of image data chosen based upon a criterion.

18. The method of claim 10, wherein creating a multilayered hybrid point grid further includes:
  populating at least one layer of a 2D occupancy grid that corresponds to an x-y layer including at least some of the feature points in the point cloud of features, with points from the point cloud of features within a height range using ray tracing from an observed location of a point aligned to a corresponding point in the multilayered 2D occupancy grid and a location of a corresponding point reprojected on the layer of the multilayered 2D occupancy grid; and
  finding cells along a ray between the observed location of the point as aligned and the corresponding point reprojected on the layer and marking the any cells found as empty.

19. A non-transitory computer readable storage medium impressed with computer program instructions to provide guidance information to guide a mobile device, which instructions, when executed on a processor, implement a method comprising:
  selecting from a plurality of sets of image data, one or more sets of image data to include in a point cloud of features, wherein image data includes feature points determined from captured image data and pose information that includes a location and an orientation of a camera that captured the image data;
  for selected sets of image data, (a) triangulating new feature points using feature points of sets of image data previously added to the point cloud of features to obtain feature points in a coordinate system of the mobile device, and (b) aligning coordinates of the feature points in the point cloud of features to a coordinate system having a z-axis aligned with gravity;
  creating a multilayered hybrid point grid from feature points selected for the point cloud of features, including at least one layer of a multilayered 2D occupancy grid; and
  providing the at least one layer of a multilayered 2D occupancy grid to a process that plans a path of travel to a location.

20. The non-transitory computer readable storage medium of claim 19, wherein creating a multilayered hybrid point grid further includes:
  populating at least one layer of a 2D occupancy grid that corresponds to an x-y layer including at least some of the feature points in the point cloud of features, with points from the point cloud of features within a height range using ray tracing from an observed location of a point aligned to a corresponding point in the multilayered 2D occupancy grid and a location of a corresponding point reprojected on the layer of the multilayered 2D occupancy grid; and
  finding cells along a ray between the observed location of the point as aligned and the corresponding point reprojected on the layer and marking the any cells found as empty.

* * * * *